(12) United States Patent
Yu et al.

(10) Patent No.: US 11,632,952 B2
(45) Date of Patent: Apr. 25, 2023

(54) UNIVERSAL DISPERSANT

(71) Applicant: NOURYON CHEMICALS INTERNATIONAL B.V., Arnhem (NL)

(72) Inventors: Hua Yu, Scarsdale, NY (US); Mojahedul Islam, Whitehouse Station, NJ (US); Christine Puglisi, Mountainside, NJ (US)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 45 days.

(21) Appl. No.: 16/690,362

(22) Filed: Nov. 21, 2019

(65) Prior Publication Data

US 2020/0154703 A1 May 21, 2020

Related U.S. Application Data

(63) Continuation-in-part of application No. 15/536,223, filed as application No. PCT/EP2015/080250 on Dec. 17, 2015, now abandoned.

(60) Provisional application No. 62/094,409, filed on Dec. 19, 2014.

(30) Foreign Application Priority Data

Feb. 2, 2015 (EP) ..................... 15153402

(51) Int. Cl.
| | |
|---|---|
| *C08G 65/26* | (2006.01) |
| *C08G 65/327* | (2006.01) |
| *C08K 3/08* | (2006.01) |
| *A01N 25/30* | (2006.01) |
| *C08K 5/357* | (2006.01) |
| *C08K 5/09* | (2006.01) |
| *C08K 5/17* | (2006.01) |
| *A01N 25/04* | (2006.01) |
| *A01N 43/38* | (2006.01) |
| *A01N 43/70* | (2006.01) |
| *A01N 47/30* | (2006.01) |
| *A01N 25/22* | (2006.01) |

(52) U.S. Cl.
CPC ............ *A01N 25/30* (2013.01); *A01N 25/04* (2013.01); *A01N 43/38* (2013.01); *A01N 43/70* (2013.01); *A01N 47/30* (2013.01); *C08G 65/26* (2013.01); *C08G 65/327* (2013.01); *C08K 3/08* (2013.01); *C08K 5/09* (2013.01); *C08K 5/17* (2013.01); *C08K 5/357* (2013.01); *A01N 25/22* (2013.01); *C08K 2003/0825* (2013.01)

(58) Field of Classification Search
CPC .......... C08G 65/327; C08G 65/26; C08K 2003/0818; C08K 3/08; C08K 2003/0825
See application file for complete search history.

(56) References Cited

U.S. PATENT DOCUMENTS

| | | | |
|---|---|---|---|
| 4,613,445 A | 9/1986 | Haack et al. | |
| 4,830,764 A | 5/1989 | Wiedemann | |
| 4,912,245 A | 3/1990 | Girardeau et al. | |
| 5,173,111 A | 12/1992 | Krishnan et al. | |
| 5,981,624 A | 11/1999 | Thetford et al. | |
| 6,024,788 A * | 2/2000 | Tomioka ................ | C08K 5/521 106/281.1 |
| 6,051,627 A | 4/2000 | Thetford et al. | |
| 6,060,210 A | 5/2000 | Cartridge et al. | |
| 6,069,210 A | 5/2000 | Cartridge et al. | |
| 6,133,366 A | 10/2000 | Thetford et al. | |
| 6,413,908 B1 | 7/2002 | Reekmans et al. | |
| 6,566,408 B1 | 5/2003 | Cotrell et al. | |
| 2010/0069272 A1* | 3/2010 | Morvan ................ | C09K 8/584 507/238 |
| 2010/0178308 A1 | 7/2010 | Iwasa et al. | |
| 2018/0103634 A1 | 4/2018 | Noller et al. | |

FOREIGN PATENT DOCUMENTS

| | | |
|---|---|---|
| CN | 1247452 A | 3/2000 |
| CN | 107454821 A | 12/2017 |
| EP | 2105458 A1 | 9/2009 |
| FR | 2394602 A1 | 1/1979 |
| JP | S6251611 | 3/1987 |
| JP | AS6388031 | 4/1988 |
| JP | 09118606 | 5/1997 |
| JP | 2001031634 A | 2/2001 |
| JP | 2004323760 A | 11/2004 |

(Continued)

OTHER PUBLICATIONS

EPO, European Extended Search Report issued in European Patent Application No. 15153402.1, dated Jul. 31, 2015.
JPO, Office Action issued in Japanese Application No. 2017-532146, dated Jun. 11, 2019.
Ziqiang et al., "Surfactants in The Textile Industry", pp. 77-78, published by China Petrochemical Press, 2001.

(Continued)

*Primary Examiner* — Shobha Kantamneni
(74) *Attorney, Agent, or Firm* — Lorenz & Kopf, LLP

(57) ABSTRACT

This disclosure provides a composition comprising a mixture of molecules of Formula (I): $\{RO-[CH(CH_3)CH_2O]_b[CH_2-CH_2O]_a\}_mP(=O)(O^-X^+)_n$ (I), wherein R is chosen from linear or branched $C_{10}$-$C_{18}$ alkyl or alkenyl groups; a is 0 to 50, b is 0-30, and a+b>0; $X^+$ is potassium, triethanolamine, or H, and m and n are each equal to 1 or 2, such that when m=1 then n=2, and when m=2 then n=1. Moreover, in the mixture some of the molecules have m=1 and n=2 and some of the molecules have m=2 and n=1, wherein the mole ratio of compounds where m=1 to compounds where m=2 is of from 1:1 to 3:1.

20 Claims, 9 Drawing Sheets

(56) References Cited

FOREIGN PATENT DOCUMENTS

| JP | 2008138075 | 6/2019 |
|---|---|---|
| WO | 9531513 A1 | 11/1995 |
| WO | 2006019772 A1 | 2/2006 |
| WO | 2008116932 A1 | 10/2008 |
| WO | 2016097162 A1 | 6/2016 |

OTHER PUBLICATIONS

Lu et al. "Food Technology", published by Henan Science and Technology Press; Sep. 30, 1998.
Song Qihuang, Fine Chemical Technology, 2nd Edition, pp. 54-55, Chemical Industry Press.

* cited by examiner

UNIVERSAL DISPERSANT

CROSS-REFERENCE TO RELATED APPLICATIONS

This is a continuation-in-part of U.S. application Ser. No. 15/536,223, filed Jun. 15, 2017, which was the National Stage Application under 35 U.S.C. § 371 based on International Application No. PCT/EP2015/080250, filed Dec. 17, 2015, which was published under PCT Article 21(2) and which claims priority to U.S. Provisional Application No. 62/094,409, filed Dec. 19, 2014, and claims priority to European Patent Application No. 15153402.1, filed Feb. 2, 2015, which are all hereby expressly incorporated in their entirety by reference.

FIELD OF THE DISCLOSURE

The present disclosure relates to dispersant compositions for use in dispersing solid particulates in a liquid medium. More particularly, the present disclosure relates to a dispersant composition comprising a blend of alkyl-alkoxy phosphate esters for dispersing inorganic and/or organic fine solid particulates such as pigments, fillers, and nanoparticles in aqueous or organic liquid media with excellent fine particle size and stability.

BACKGROUND OF THE DISCLOSURE

It is known to use surfactant compositions prepared from phosphoric acid esters of polyoxyalkylenated compounds as wetting agents. Also the use of these compounds for the preparation of aqueous suspensions of insoluble substances is known.

U.S. Pat. No. 4,830,764 discloses polyoxyalkylene-containing phosphoric acid esters as wetting agents, especially in the pre-treatment of cellulosic textile materials, wherein the esters are phosphoric acid partial esters derived from a block ethoxylated and propoxylated C9-16 aliphatic alcohol.

U.S. Pat. No. 4,912,245 discloses phosphoric acid ester-based compositions in acidic or neutralized form containing a mixture of at least one polyoxyalkylenated phosphoric acid monoester and at least one polyoxyalkylenated diester and a nonionic polyoxyalkylenated compound. An object is to provide compositions with useful wettability and dispersability properties having a phosphoric acid monoester and diester surfactant mixture.

U.S. Pat. No. 6,051,627 discloses phosphate esters of polyalkylene ether block copolymers and their use as dispersants, wherein the dispersant is a phosphate ester of a polyalkylene ether block copolymer, the ester comprising a terminal methoxy group, an ethoxy block, and a propoxy block, the compounds being useful for dispersing particulate solids in an aqueous medium, such as in paints and inks.

U.S. Pat. No. 6,069,210 discloses phosphate esters of polyalkylene ether block copolymers and their use as dispersants, wherein the dispersant is a phosphate ester of a polyalkylene ether block copolymer, the ester comprising a terminal group that is a methoxyl or ethoxyl group, a propoxylene group, and an ethoxylene group.

FR 2,394,602 discloses a biodegradable hydrocarbon dispersant compound that comprises a mixture of phosphoric acid monoesters and diesters, the compounds including ethoxyl groups and propoxyl groups, the compounds being said to be useful for the treatment of hydrocarbon spillages on the ground or the water.

It would be desirable to provide dispersant compositions that are effective as particulate dispersants in both aqueous and organic media, and that can be used with a variety of different particulate materials. It further would be desirable to provide dispersant compositions that are effective as particulate dispersants in both aqueous and organic media, and that can be used with a variety of different pigment particulates. It further is desirable to provide dispersant compositions wherein the dispersants exhibit lower levels of ecotoxicity and the dispersant compositions exhibit greater biodegradability.

SUMMARY OF THE DISCLOSURE

This disclosure provides a composition comprising a mixture of molecules of Formula (I): $\{RO\text{---}[CH(CH_3)CH_2O]_b[CH_2\text{---}CH_2O]_a\}_mP(\text{=}O)(O^-X^+)_n$ (I), wherein R is chosen from linear or branched $C_{10}$-$C_{18}$ alkyl or alkenyl groups; a is 0 to 50, b is 0-30, and a+b>0; $X^+$ is potassium, triethanolamine, or H (e.g. $H^+$), and m and n are each equal to 1 or 2, such that when m=1 then n=2, and when m=2 then n=1. Moreover, in the mixture some of the molecules have m=1 and n=2 and some of the molecules have m=2 and n=1, wherein the mole ratio of compounds where m=1 to compounds where m=2 is of from 1:1 to 3:1.

DETAILED DESCRIPTION OF THE DISCLOSURE

Figure 1:
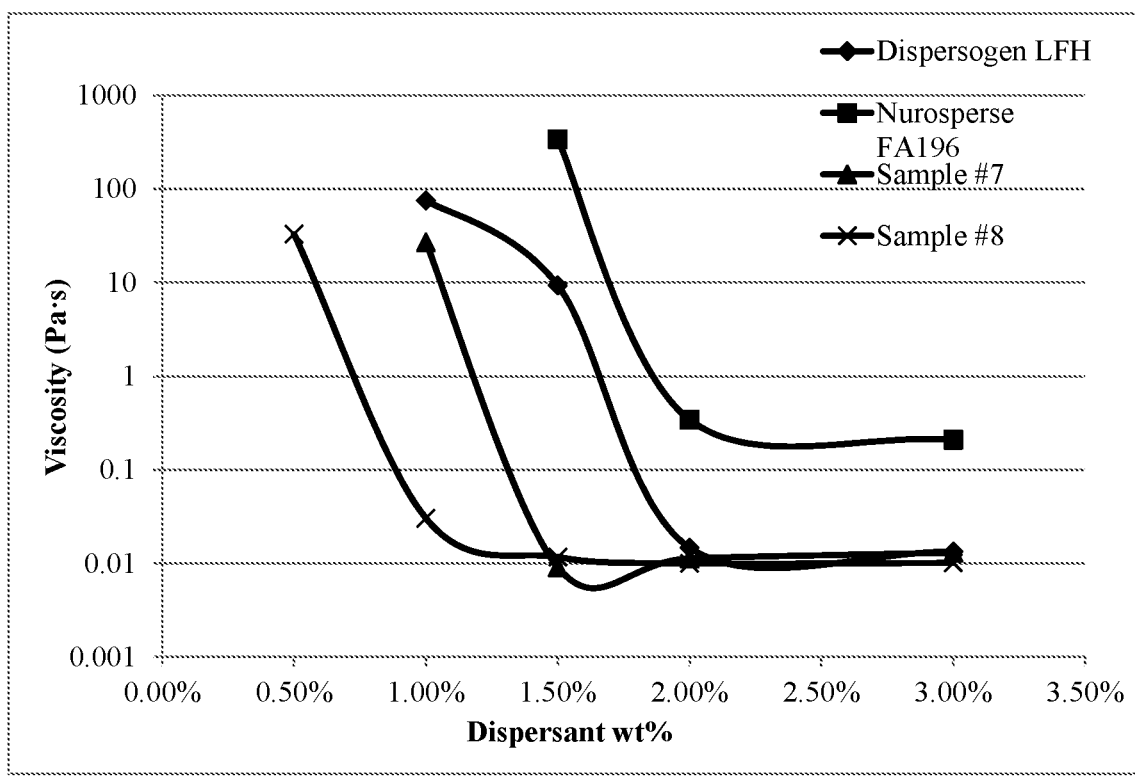
FIG. 1 is a graph of viscosity vs. dispersant wt % for four different dispersants using an iron oxide pigment loaded at 49% in water.

The objects of the disclosure are achieved by providing dispersant compositions that comprise blends of polyoxyalkylenated mono- and di-phosphate esters, as described more fully herein. The dispersant compositions of the disclosure can be combined with an amount of particulate material and an aqueous or organic medium, wherein the dispersant composition facilitates the dispersion of the particulate material in the medium to form a dispersion formulation.

In accordance with the disclosure dispersant compositions are provided that are suitable for dispersing a wide variety of particulate materials in aqueous and/or organic media. The inventive dispersant compositions comprise a blend of mono- and di-esters of alkylalkoxylates and phosphoric acid of formula (I), hereinafter called polyoxyalkylenated mono- and di-phosphate esters, wherein the polyoxyalkylene moiety includes ethoxyl and/or propoxyl monomers, wherein the polyoxyalkylene moiety is terminated by a linear or branched alkyl or alkenyl radical, the mono- and di-phosphate esters being of the general formula

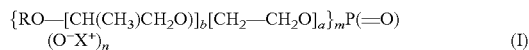

wherein a=0-50, b=0-30, and a+b>0; m and n are each equal to 1 or 2, such that when m=1 then n=2, and when m=2 then n=1; and wherein R and X are defined below.

In one aspect of the disclosure R is chosen from linear or branched $C_1$-$C_{30}$ alkyl or alkenyl and the counter-ion X is $CH_3$—$(CH_2)_c$—$C(O)NH(CH_2)_dN^+HR^2R^3$, wherein c=0 to 30, d=1 to 5, and $R^2$ and $R^3$ are independently chosen from —$CH_2CH_2OH$ and linear or branched —$C_1$-$C_5$alkyl.

In one aspect of the disclosure R is $C_8$-$C_{13}$ branched alkyl and the counter-ion X is chosen from (i) $CH_3$—$(CH_2)_c$—$C(O)NH(CH_2)_dN^+HR^2R^3$, wherein c=0 to 30, d=1 to 5, and $R^2$ and $R^3$ are independently chosen from —$CH_2CH_2OH$ and linear or branched —$C_1$-$C_5$alkyl;

(ii) an optionally substituted heterocyclic or heteroaryl group containing at least one nitrogen ring atom; and (iii) a monovalent inorganic cation.

In one embodiment the ethoxyl and propoxyl monomers are arranged in a random configuration in the polyoxyalkylene moiety. In one embodiment the ethoxyl and propoxyl monomers are arranged in a block configuration in the polyoxyalkylene moiety. In one embodiment the ethoxyl block of the polyoxyalkylene block configuration moiety is bonded to the phosphate group.

In one aspect the disclosure relates to methods of making the inventive dispersant compositions.

In one aspect the disclosure relates to dispersion formulations comprising an aqueous or organic medium, the inventive dispersant composition, and any of a variety of particulate materials, including without limitation pigments such as red iron oxide, titanium dioxide, carbon black, yellow oxide, and copper phthalocyanine blue; fillers; nanomaterials; and other particulate materials; wherein the dispersion formulation is a stable dispersion of the particulate material in the medium.

In one aspect the disclosure relates to methods of preparing dispersion formulations comprising an aqueous or organic medium, the inventive dispersant compositions, and any of a variety of particulate materials, including without limitation pigments such as red iron oxide, titanium dioxide, carbon black, yellow oxide, and copper phthalocyanine blue; fillers; nanomaterials; and other particulate materials suitable for dispersion formulations used in a variety of commercial, agricultural and industrial applications; wherein the dispersion formulation is a stable dispersion of the particulate material in the aqueous or organic medium.

In one embodiment the blend of polyoxyalkylenated mono- and di-phosphate esters of the present disclosure comprises a mixture of molecules of Formula (I)

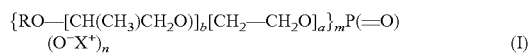

wherein a=0-50, b=0-30, and a+b>0; m and n are each equal to 1 or 2, such that when m=1 then n=2, and when m=2 then n=1; and wherein R and X are as defined below. When m=1 and n=2 then a compound of formula (I) is a monoester, when m=2 and n=1 then a compound of formula (I) is a diester. In one embodiment the compositions of the disclosure include blends of compounds of formula (I) wherein the mole ratio of monoesters to diesters is in the range of 1:1 to 8:1; in one embodiment in the range of 1.5:1 to 5:1; in one embodiment in the range of 1.5:1 to 3:1

In Formula (I) "b" represents the number of propoxyl monomers in the propoxylene segment and "a" represents the number of ethoxyl monomers in the ethoxylene segment. The selection of the values of "b" and "a" can depend on a variety of factors, including the nature of the particulate matter to be dispersed, and the nature of the aqueous or organic medium in which the particulate matter is to be dispersed. Either "a" or "b" is optionally zero, but "a" and "b" both cannot be zero. In one embodiment of the disclosure b is greater than 0. In one embodiment of the disclosure the ratio of a:b is in the range of 1:1 to 10:1. In one embodiment of the disclosure the ratio of a:b is in the range of 2:1-5:1.

In one aspect of the disclosure R is chosen from linear or branched $C_1$-$C_{30}$ alkyl or alkenyl, and X is $CH_3$—$(CH_2)_c$—$C(O)NH(CH_2)_dN^+HR^2R^3$, wherein c=0 to 30, d=1 to 5, and $R^2$ and $R^3$ are independently chosen from —$CH_2CH_2OH$ and linear or branched —$C_1$-$C_5$alkyl.

The R group can be either alkyl or alkenyl, and can be either linear or branched. In one embodiment the R group contains at least one carbon atom; in one embodiment R contains at least 3 carbon atoms; in one embodiment R contains at least 4 carbon atoms; in one embodiment R contains at least 7 carbon atoms; in one embodiment R contains at least 8 carbon atoms, in one embodiment R contains at least nine carbon atoms, in one embodiment R contains at least 13 carbon atoms. In one embodiment R contains no more than 30 carbon atoms; in one embodiment no more than 25 carbon atoms; in one embodiment R contains no more than 20 carbon atoms. In one embodiment of the disclosure the R group is linear. In one embodiment of the disclosure the R group is branched. In one embodiment of the disclosure the R group is substituted. In one embodiment of the disclosure the R group is unsubstituted. In one embodiment of the disclosure the R group is chosen from 2-ethylhexyl, 2-ethylheptyl, and isotridecyl. In one embodiment the R group is 2-ethylhexyl. In one embodiment the R group is isotridecyl. In one embodiment the R group is chosen from straight or branched butyl, pentyl, hexyl, cyclohexyl, heptyl, octyl, nonyl, decyl, undecyl, and dodecyl. In one embodiment of the disclosure the R group comprises a non-aromatic cyclic moiety.

Any source can be used to provide the R group of formula (I). In one embodiment R is derived from a petroleum source. In one embodiment R is derived from a natural source. Typical natural sources are oils and fats, such as oils and fats from land animals, marine animals, and plants. Sources of fat and oils from land animals include butterfat, depot fat, lard oil, neat's foot oil, and tallow (such as from beef or mutton). Sources of fat and oils from marine animals include cold-liver oil, herring oil, menhaden oil, sardine oil, sperm oil, and whale oil. Sources of fats and oils from plants include babassu oil, castor oil, cocoa butter, coconut oil, corn oil, cotton seed oil, linseed oil, mustard oil, neem oil, niger-seed oil, oiticica oil, olive oil, palm oil, palm-kernel oil, peanut oil, perilla oil, poppy-seed oil, rapeseed oil, safflower oil, sesame oil, soybean oil, sunflower-seed oil, tall oil, tung oil, and wheat germ oil.

In one approach, suitable oils and fats are chosen from coconut, soybean (soya), tallow, palm, palm kernel, rapeseed, lard, sunflower, corn, safflower, canola, olive, peanut, and combinations thereof. In another approach, the suitable oils and fats are chosen from soybean oil, tallow or coconut oil, such as fully or partially hydrogenated soybean oil, fully or partially hydrogenated tallow, or fully or partially hydrogenated coconut oil. In some approaches, the fatty acid is fully or partially hydrogenated tallow, and in certain approaches, the source of the fatty acid is fully hydrogenated tallow.

Suitable fatty acids may include saturated acids such as isovaleric acid, valeric acid, caproic acid, enanthic acid, caprylic acid, pelargonic acid, capric acid, lauric acid, tridecylic acid, myristic acid, pentadecylic acid, palmitic acid, margaric acid, stearic acid, arachidic acid, phytanic acid, behenic acid, lignoceric acid, cerotic acid and montanic acid; or monounsaturated acids such as caproleic acid, palmitoleic acid, oleic acid, vaccenic acid, elaidic acid, brassidic acid, erucic acid, and nervonic acid; diunsaturated acids such as linoleic acid; triunsaturated acids such as eleosteric acid and linolenic acid; and tetraunsaturated acids such as arachidonic acid. In some approaches, the fatty acids are stearic acid, arachidic acid, phytanic acid, behenic acid, lignoceric acid, cerotic acid, montanic acid, oleic acid, vaccenic acid elaidic acid, brassidic acid, erucic acid, nervonic acid, linoleic acid, eleosteric acid, linolenic acid, and arachidonic acid. In yet other approaches, the suitable fatty acids are chosen from stearic acid, oleic vaccenic acid, elaidic acid, linoleic acid, eleosteric acid, linolenic acid.

R is a linear or branched alkyl or alkenyl radical(s) comprising —$C_1$-$C_{30}$, such as —$C_4$-$C_{30}$, or —$C_{18}$-$C_{30}$. In some embodiments, R comprises at least $C_6$, at least $C_8$, at least $C_9$, at least $C_{12}$, at least $C_{13}$, or $C_{12}$-$C_{18}$. In other embodiments, R comprises $C_{18}$-$C_{30}$.

R may be saturated or unsaturated. R may have an iodine value of 5-30. R may be hydrogenated, such as partially or fully hydrogenated. In some embodiments, R may be fully hydrogenated.

Further in this aspect of the disclosure, with respect to the counter-ion X, in one embodiment $R^2$ and $R^3$ are independently chosen from linear or branched —$C_1$-$C_5$alkyl, in one embodiment from linear or branched —$C_1$-$C_4$alkyl, in one embodiment from linear or branched —$C_1$-$C_3$alkyl, in one embodiment from —$C_1$-$C_2$alkyl. In one embodiment $R^2$ and $R^3$ are each methyl. Further in this aspect of the disclosure, with respect to the counter-ion X, in one embodiment c=0 to 30, in one embodiment c=0 to 24, in one embodiment c=0 to 18, in one embodiment c=0 to 12, in one embodiment c=0 to 10, in one embodiment c=0 to 8, in one embodiment c=0 to 6, in one embodiment c=0 to 4, in one embodiment c=0 to 2. Further in this aspect of the disclosure, with respect to the counter-ion X, in one embodiment d=1-5, in one embodiment d=1-3, in one embodiment d=3. In one embodiment X is a quaternized or protonated alkyl amidopropyldimethylamine, in one embodiment a quaternized or protonated caproic amidopropyldimethylamine, in one embodiment a quaternized or protonated caprylic amidopropyldimethylamine, in one embodiment a quaternized or protonated capric amidopropyldimethylamine, in one embodiment a quaternized or protonated coco amidopropyldimethylamine. In one embodiment X is a mixture of any two or more quaternized or protonated amidopropyldimethylamine compounds.

In one aspect of the disclosure, with respect to the mono and diesters of Formula (I) R is —$C_8$-$C_{13}$ branched alkyl and X is chosen from (i) $CH_3$—$(CH_2)_c$—$C(O)NH(CH_2)_d N^+ HR^2 R^3$, wherein c=0 to 30, d=1 to 5, and $R^2$ and $R^3$ are independently chosen from —$CH_2CH_2OH$ and linear or branched —$C_1$-$C_5$alkyl, and otherwise defined as above;

(ii) an optionally substituted heterocyclic or heteroaryl group containing at least one nitrogen ring atom; and (iii) a monovalent inorganic cation.

In one embodiment of this aspect of the disclosure R is chosen from 2-ethylhexyl, 2-ethylheptyl, and isotridecyl; in one embodiment R is 2-ethylhexyl.

In one aspect of the disclosure, R is $C_1$-$C_7$ linear or branched alkyl or alkenyl. In one aspect of the disclosure, $X^+$ is an optionally substituted heterocyclic or heteroaryl group containing at least one nitrogen ring atom or a monovalent inorganic cation. In one aspect of the disclosure, the disclosure may not comprise the embodiment wherein R is $C_8$-$C_{13}$ branched alkyl and $X^+$ is $CH_3$—$(CH_2)_c$—$C(O)NH(CH_2)_d N^+ HR^2 R^3$, wherein c=0 to 30, d=1 to 5, and $R^2$ and $R^3$ are independently chosen from —$CH_2CH_2OH$ and linear or branched —$C_1$-$C_5$ alkyl. In one aspect of the disclosure, the disclosure may not comprise the embodiment wherein R is 2-ethylhexyl, 2-ethylheptyl or isotridecyl and $X^+$ is $CH_3$—$(CH_2)_c$—$C(O)NH(CH_2)_d N^+ HR^2 R^3$, wherein c=0 to 30, d=1 to 5, and $R^2$ and $R^3$ are independently chosen from —$CH_2CH_2OH$ and linear or branched —$C_1$-$C_5$ alkyl.

Further in this aspect of the disclosure, when the moiety X is an optionally substituted heterocyclic or heteroaryl group containing at least one nitrogen ring atom, in one embodiment X is chosen from piperidinyl, piperazinyl, morpholinyl, pyrrolidinyl, pyrrolyl, pyrazolyl, pyridinyl, pyrazinyl, pyrimidinyl, pyridazinyl, indolyl, isoindolyl, imidazolyl, oxazolyl, and isooxazolyl, each of which is optionally substituted. In one embodiment X is a monocyclic, optionally substituted, saturated or unsaturated heterocyclic group with at least one nitrogen ring atom. In one embodiment X is a bicyclic, optionally substituted, saturated or unsaturated heterocyclic group with at least one nitrogen ring atom. In one embodiment X is a polycyclic, optionally substituted, saturated or unsaturated heterocyclic group with at least one nitrogen ring atom. In one embodiment X is a mixture of two or more of any of the foregoing optionally substituted saturated or unsaturated heterocyclic groups with at least one nitrogen ring atom. In one embodiment X is morpholinyl.

Further in this aspect of the disclosure when X is a monovalent inorganic cation, in one embodiment X is chosen from $Li^+$, $K^+$, $Na^+$, $Rb^+$, $Cs^+$, and $NH_4^+$, in one embodiment X is $Na^+$, in one embodiment X is $K^+$, in one embodiment X is $NH_4^+$.

In one embodiment of the disclosure the dispersant composition can be prepared by the method comprising the steps of (i) providing an alkyl or alkenyl alcohol of formula R—OH where R is the desired linear or branched alkyl or alkenyl moiety having 1-30 carbon atoms, (ii) polymerizing propylene oxide in the presence of the alkyl or alkenyl alcohol to form a first intermediate of the formula RO—$[CH(CH_3)CH_2O]_b$—, (iii) polymerizing ethylene oxide in the presence of the first intermediate of step (ii) to form a second intermediate of the formula RO—$[CH(CH_3)CH_2O]_b[CH_2$—$CH_2O]_a$—, (iv) reacting the second intermediate of step (iii) with phosphorous pentoxide to form a blend of phosphate mono- and di-esters of the formula $\{RO-[CH(CH_3)CH_2O)]_b[CH_2-CH_2O]_a\}_mP(=O)(OH)_n$, and (v) reacting the blend of phosphate mono- and di-esters with the desired counter-ion X to form compounds of formula $\{RO-[CH(CH_3)CH_2O)]_b[CH_2-CH_2O]_a\}_mP(=O)(OX)_n$, where R, a, b, m, n and X have the meanings set forth above.

Either step (ii) or step (iii) can be omitted from the dispersant composition preparation method, provided that at least one of step (ii) and step (iii) is included.

In the embodiment in which b=0, the method comprises the steps of
(i) providing an alkyl or alkenyl alcohol of formula R—OH where R is the desired linear or branched alkyl or alkenyl moiety having 1-30 carbon atoms,
(ii) polymerizing ethylene oxide in the presence of the alkyl or alkenyl alcohol to form an intermediate of the formula $RO-[CH_2-CH_2O]_a-$,
(iii) reacting the intermediate of step (ii) with phosphorous pentoxide to form a blend of phosphate mono- and di-esters of the formula $\{RO-[CH_2-CH_2O]_a\}_mP(=O)(OH)_n$, and
(iv) reacting the blend of phosphate mono- and di-esters with the desired counter-ion X to form compounds of formula

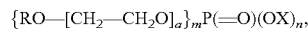

$\{RO-[CH_2-CH_2O]_a\}_mP(=O)(OX)_n$, where R, a, m, n and X have the meanings set forth above.

In the embodiment in which a=0, the method comprises the steps of
(i) providing an alkyl or alkenyl alcohol of formula R—OH where R is the desired linear or branched alkyl or alkenyl moiety having 1-30 carbon atoms,
(ii) polymerizing propylene oxide in the presence of the alkyl or alkenyl alcohol to form an intermediate of the formula $RO-[CH(CH_3)CH_2O)]_b-$,
(iii) reacting the intermediate of step (ii) with phosphorous pentoxide to form a blend of phosphate mono- and di-esters of the formula $\{RO-[CH(CH_3)CH_2O)]_b\}_mP(=O)(OH)_n$, and
(iv) reacting the blend of phosphate mono- and di-esters with the desired counter-ion X to form compounds of formula $\{RO-[CH(CH_3)CH_2O)]_b\}_mP(=O)(OX)_n$, where R, b, m, n and X have the meanings set forth above.

In one embodiment the reaction product of any of the foregoing methods can be mixed with an aqueous or organic carrier to form the dispersant composition. In one embodiment the mixture of the reaction product and the carrier is in the form of a liquid. In one embodiment the mixture of the reaction product and the carrier is in the form of a paste.

In one embodiment the disclosure relates to dispersion formulations comprising the dispersant compositions of the present disclosure, a particulate matter to be dispersed, and an aqueous or organic medium. Particulate materials suitable for use in the dispersion formulations of the present disclosure include without limitation pigments such as red iron oxide, titanium dioxide, carbon black, yellow oxide, and copper phthalocyanine blue. In addition to pigments and other colorants, the dispersant compositions of the present disclosure also can be used to prepare dispersion formulations in which the dispersed particulate material is chosen from fillers, nanomaterials, and other organic and non-organic particulate materials. Depending on the particular commercial, agricultural or industrial intended application of the dispersion formulation, the particulate material to be dispersed can be chosen from calcium carbonate, organo modified and unmodified silica, talc, organo modified and unmodified clay, pesticides, herbicides, fungicides, micronutrients, and other particulate materials that will be known to those skilled in the art.

The medium of the dispersion formulation can be aqueous or organic, or a mixture thereof. Suitable aqueous media include without limitation deionized water, regular tap water, hardwater, seawater, and brines. Suitable organic media can be aliphatic or aromatic. Suitable organic media include without limitation alcohols, alkyl acetates, ketones, alicyclic solvents, petroleum ethers, mineral spirits, odorless mineral spirits, varnish naphtha, petroleum distillate fractions, and mixtures of any of the foregoing. Suitable alcohols include without limitation 2-butoxyethanol, denatured ethyl alcohol, isopropyl alcohol, ethylene glycol, ethylene glycol ether, ethylene glycol ether acetate, and methyl ethyl ketone. Suitable alkyl acetates include without limitation methyl acetate, ethyl acetate, isopropyl acetate, n-butyl acetate, isoamyl acetate, glycol ether acetates, polyvinyl alcohol acetates. Suitable aromatic solvents include without limitation optionally substituted benzene, ethylbenzene, xylene, and toluene. Xylene can be a mixture of ortho-, meta- and para-xylenes as is known in the art. Other useful liquid media will be known to those skilled in the art and will be selected based on the nature of the particulate material and the particular application in which the dispersion formulation will be used.

The dispersion formulations of the present disclosure are suitable for use in a wide variety of commercial, agricultural and industrial applications in which a stable dispersion of a particulate material in a liquid medium is required or desired. The dispersion formulations of the present disclosure can be used in paint formulations, colorant formulations, liquid pigment concentrates, anti-foulant formulations, formulations for use in chemical mechanical planarization or chemical mechanical polishing, carbon black dispersions for use in lithium batteries, conductive carbon nanotube dispersions, formulations for dispersion of automotive engine deposits, formulations for use in concrete preparation, clay dispersant formulations for oil field applications, pesticide formulations, and formulations for water treatment facilities.

In one embodiment of the dispersion formulations, the particles are pigment particles. Formulations comprising a high proportion of pigment, i.e. pigment concentrates, are typical, because such formulations are particularly effective in providing color and hiding to paints. The pigment concentrates generally comprise 5 to 85% by weight, typically 20 to 75% by weight of pigment, based on the total weight of the pigment concentrate.

The formulation suitably comprises up to 100% by weight, typically 1 to 100% by weight, and most typically 2 to 50% by weight of the dispersant composition of the disclosure, calculated on the weight of the pigment. The most suitable amount of dispersant composition depends, among others, on the particular type of pigment to be dispersed. The formulation may optionally comprise other known additives, such as additional dispersing agents, anti-foaming agents, and/or polymeric or oligomeric binders.

The formulation may be a liquid composition comprising an organic and/or an aqueous based diluent. Also dry pigment concentrates can be used, for example in the form of powders, pellets or tablets.

The pigment concentrate can be part of a modular system for preparation of a pigmented coating formulation. Such a modular system may, for example, comprise one or more pigment concentrates as a tinting module, a binder module, and a reducer module. The base coat formulations mentioned below can suitably be prepared by mixing the modules of such a modular system.

The pigment concentrates or tinting pastes can be obtained by a process wherein a liquid mixture comprising a pigment, the dispersant composition of the disclosure, and optionally a liquid diluent are subjected to shear force. The pigment dispersion formulation of the disclosure can be used in combination with one or more other pigment dispersion aids and/or surfactants. Examples of suitable equipment for carrying out the process are bead mills, jet mills, ultrasonic mills, basket mills, roll mills, and high-speed dissolvers. Inorganic or organic pigments or mixtures thereof may be used. Typically, water is used as a liquid diluent. Instead of water or in addition to water organic solvents may be used, such as glycols or glycol ethers, for example ethylene glycol or higher homologues thereof or ethylene glycol mono-n-butyl ether.

The dispersant compositions according to the disclosure can also be used for the preparation of stir-in pigments.

In one embodiment, the dispersion formulation according to the disclosure is a solid pigment preparation comprising a pigment and the polyurethane dispersant resin, wherein the composition comprises at least 35% by weight of at least one pigment and at most 65% by weight of dispersant resin, calculated on the combined weight of pigment and dispersant resin.

The pigment preparation of the disclosure can be used as a stir-in pigment preparation, leading to coating formulations with stably dispersed pigments. The pigment preparation can be easily incorporated into coating formulations in which the pigments are stably dispersed. In addition, it is possible to prepare the pigment preparation with a wide range of pigments. The pigment preparation allows the preparation of paint having excellent properties and stability, especially in the case of difficult to disperse and stabilize pigments.

The pigment preparation of the disclosure may comprise an inorganic or an organic pigment. Alternatively, the pigment preparation may comprise a plurality of different pigments, for example two or more inorganic pigments, two or more organic pigments, or a mixture of one or more inorganic pigments and one or more organic pigments.

The pigment particles within the formulation are generally present in finely divided form. Accordingly, the pigments typically have average particle sizes within the range of 50 nm to 5,000 nm. Typically, the average particle size is at least 80 nm, more typically at least 100 nm. It is preferable that the average particle size is at most 3,000 nm, more typically at most 1,500 nm, and most typically at most 1,000 nm.

The average particle size of the pigment particles within the preparation can for example be determined by electron microscopy. Since the average particle size of the pigments within the preparation is essentially the same as the average particle size of the pigments after they are stirred into a liquid, it is also possible to mix the pigment preparation with a liquid medium and to determine the average pigment particle size by dynamic light scattering.

The organic pigments typically are organic chromatic and black pigments. The inorganic pigments can likewise be color pigments (chromatic, black, and white pigments), as well as luster pigments and the inorganic pigments which are typically used as fillers.

Examples of suitable organic color pigments are: monoazo pigments: C.I. Pigment Brown 25; C.I. Pigment Orange 5, 13, 36, 38, 64, and 67; C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247, and 251; C.I. Pigment Yellow 1, 3, 62, 65, 73, 74, 97, 120, 151, 154, 168, 181, 183, and 191; C.I. Pigment Violet 32; diazo pigments: C.I. Pigment Orange 16, 34, 44, and 72; C.I. Pigment Yellow 12, 13, 14, 16, 17, 81, 83, 106, 113, 126, 127, 155, 174, 176, 180, and 188; diazo condensation pigments: C.I. Pigment Yellow 93, 95, and 128; C.I. Pigment Red 144, 166, 214, 220, 221, 242, and 262; C.I. Pigment Brown 23 and 41; anthanthrone pigments: C.I. Pigment Red 168; anthraquinone pigments: C.I. Pigment Yellow 147, 177, and 199; C.I. Pigment Violet 31; anthrapyrimidine pigments: C.I. Pigment Yellow 108; quinacridone pigments: Pigment Orange 48 and 49; C.I. Pigment Red 122, 202, 206, and 209; C.I. Pigment Violet 19; quinophthalone pigments: C.I. Pigment Yellow 138; diketopyrrolopyrrole pigments: C.I. Pigment Orange 71, 73, and 81; C.I. Pigment Red 254, 255, 264, 270, and 272; dioxazine pigments: C.I. Pigment Violet 23 and 37; C.I. Pigment Blue 80; flavanthrone pigments: C.I. Pigment Yellow 24; indanthrone pigments: C.I. Pigment Blue 60 and 64; isoindoline pigments: C.I. Pigments Orange 61 and 69; C.I. Pigment Red 260; C.I. Pigment Yellow 139 and 185; isoindolinone pigments: C.I. Pigment Yellow 109, 110, and 173; isoviolanthrone pigments: C.I. Pigment Violet 31; metal complex pigments: C.I. Pigment Red 257; C.I. Pigment Yellow 117, 129, 150, 153, and 177; C.I. Pigment Green 8; perinone pigments: C.I. Pigment Orange 43; C.I. Pigment Red 194; perylene pigments: C.I. Pigment Black 31 and 32; C.I. Pigment Red 123, 149, 178, 179, 190, and 224; C.I. Pigment Violet 29; phthalocyanine pigments: C.I. Pigment Blue 15, 15:1, 15:2, 15:3, 15:4, 15:6, and 16; C.I. Pigment Green 7 and 36; pyranthrone pigments: C.I. Pigment Orange 51; C.I. Pigment Red 216; pyrazoloquinazolone pigments: C.I. Pigment Orange 67; C.I. Pigment Red 251; thioindigo pigments: C.I. Pigment Red 88 and 181; C.I. Pigment Violet 38; triarylcarbonium pigments: C.I. Pigment Blue 1, 61 and 62; C.I. Pigment Green 1; C.I. Pigment Red 81, 81:1, and 169; C.I. Pigment Violet 1, 2, 3, and 27; C.I. Pigment Black 1 (aniline black); C.I. Pigment Yellow 101 (aldazine yellow); C.I. Pigment Brown 22.

Examples of suitable inorganic color pigments are: white pigments: titanium dioxide (C.I. Pigment White 6), zinc white, pigment grade zinc oxide; zinc sulfide, lithopone; black pigments: iron oxide black (C.I. Pigment Black 11), iron manganese black, spinel black (C.I. Pigment Black 27); carbon black (C.I. Pigment Black 7); chromatic pigments: chromium oxide, chromium oxide hydrate green; chrome green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt violet; manganese violet; red iron oxide (C.I. Pigment Red 101); cadmium sulfoselenide (C.I. Pigment Red 108); cerium sulfide (C.I. Pigment Red 265); molybdate red (C. I. Pigment Red 104); ultramarine red; brown iron oxide (C.I. Pigment Brown 6 and 7), mixed brown, spinel phases and corundum phases (C.I. Pigment Brown 29, 31, 33, 34, 35, 37, 39, and 40), chromium titanium yellow (C.I. Pigment Brown 24), chrome orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164, and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Examples of inorganic pigments typically used as fillers are transparent silicon dioxide, ground quartz, aluminum oxide, aluminum hydroxide, natural micas, natural and precipitated chalk, and barium sulfate.

Luster pigments are platelet-shaped pigments having a monophasic or polyphasic construction whose color play is marked by the interplay of interference, reflection, and absorption phenomena. Examples are aluminum platelets and aluminum, iron oxide, and mica platelets bearing one or more coats, especially of metal oxides.

As mentioned above, the pigment preparation of the disclosure comprises as essential ingredients a pigment and a dispersant composition. When solid, the composition suitably comprises at least 35% by weight of at least one pigment and at most 65% by weight of dispersant resin, calculated on the combined weight of pigment and dispersant resin. When the pigment in the preparation is carbon black, it is typical that the content of carbon black in the pigment preparation is in the lower part of the described range. Thus, when the pigment is carbon black, the pigment preparation typically comprises at least 40% by weight, more typically at least 45% by weight of carbon black, and at most 60% by weight, typically at most 55% by weight of dispersant resin, calculated on the combined weight of pigment and dispersant resin. With other pigments, the pigment preparation generally comprises at least 60% by weight, typically at least 64% by weight, more typically at least 68% by weight, and most typically at least 70% by weight of at least one pigment, and at most 40% by weight, typically at most 36% by weight, more typically at most 32% by weight, and most typically at most 30% by weight of dispersant resin, calculated on the combined weight of pigment and dispersant resin. In a particularly typical embodiment, the above-mentioned weight ratios of pigment and dispersant resin also apply when calculated on the total weight of the pigment preparation.

The pigment preparation may further comprise other ingredients, additives or auxiliaries commonly used in pigment preparations, such as organic solvents, wetting agents, anti-foaming agents, heat stabilizers, light stabilizers, antioxidants, and other pigment dispersion aids and/or surfactants.

In one embodiment, the pigment preparation of the disclosure is a free-flowing powder which is suitable for use as stir-in pigment. Also solid compacted pigment concentrates can be used, for example in the form of pellets or tablets.

The disclosure further relates to a process for the preparation of a pigment formulation comprising the steps of a) stirring a mixture comprising a pigment and the dispersant composition according to the disclosure, optionally with added water or organic diluent, to form a fluidized pigment slurry, b) optionally, milling the slurry, and c) drying the slurry.

As mentioned above in respect of the pigment preparation, the pigment used in the process can be an organic or an inorganic pigment. It is also possible to use a mixture of pigments, for example a mixture of two or more inorganic pigments, a mixture of two or more organic pigments, or a mixture of inorganic and organic pigments. It is possible to use a large variety of pigments in the process. The pigments can be introduced into the process as standard dried pigments. The milling step serves to break up agglomerates and to achieve the required pigment particle size. Organic pigments are also available as so-called press cakes. Organic pigments, when synthesized, are in the form of very small crystals, called primary particles. The aim of pigment synthesis is to produce primary particles of a size that optimizes pigment application properties such as color strength, tone and brightness, transparency and opacity, and flow properties. The press cake contains the pigment essentially in this disaggregated form. Hence, less energy is required to break up agglomerates and to achieve the required pigment particle size. During drying of the pigment press cake in the absence of dispersant composition, primary particles will join together to form aggregates and agglomerates. Therefore, when an organic pigment is used in the process, it is possible and typical to use the organic pigment in the form of a pigment press cake. When pigment press cakes are used, simple stirring of the fluidized pigment slurry may be sufficient to achieve the required pigment particle size. Milling of the slurry may be redundant in such cases.

When additional liquid is required to fluidize the mixture of pigment and dispersant composition, it is typical that the liquid is water. Instead of water or in addition to water organic solvents may be used, such as glycols or glycol ethers, for example ethylene glycol or higher homologues thereof or ethylene glycol mono-n-butyl ether.

The optional milling step can be carried out using well-known milling equipment usually employed for breaking down the particle size of pigments. Examples of suitable equipment for carrying out the process are bead mills, jet mills, ultrasonic mills, basket mills, roll mills, and high-speed dissolvers. Milling is generally continued until the average particle size is within the range of 50 nm to 5,000 nm. Typically, the average particle size is at least 80 nm, more typically at least 100 nm. It is preferable that the average particle size is at most 3,000 nm, more typically at most 1,500 nm, and most typically at most 1,000 nm.

Examples of suitable methods of drying are spray granulation and fluidized bed drying, spray-drying, drying in a paddle dryer, evaporation and subsequent comminution, and freeze-drying. The selected method of drying may influence the particle size of the pigment preparations of the present disclosure. The drying step is typically carried out by freeze-drying or by spray-drying.

Spray and fluidized bed granulation may produce coarsely divided granules having average particle sizes from 50 to 5,000 μm and especially from 100 to 1,000 μm. Depending on the process conditions, spray-drying may also produce finely divided pigment preparations. Spray-drying typically produces granules having average particle sizes <20 μm. Finely divided preparations are also obtainable by drying in a paddle dryer and by evaporation with subsequent grinding.

The residual moisture content of the dried pigment preparation obtained can vary significantly, provided that the dried preparation is a solid preparation. The residual moisture content may for example be 15% by weight, calculated on the weight of the total pigment preparation. Generally, the residual moisture content does not exceed 15% by weight, typically it does not exceed 12% by weight. In many cases, the residual moisture content is even less than 5% by weight. When the pigment preparation is intended for use in non-aqueous systems, a low residual moisture content is particularly typical, for example less than 2% by weight.

The pigment preparations of the present disclosure are notable in use for their excellent color properties, especially with regard to color strength, brilliance, hue and hiding power, and especially for their stir-in characteristics, i.e. they can be dispersed in application media with a minimal input of energy, simply by stirring or shaking.

The pigment preparations of the present disclosure additionally have the following advantages: they have a high pigment content, exhibit very good stability in storage, are both economically and ecologically advantageous with regard to packaging, storage, and transportation, and they are more flexible in use.

The pigment preparations of the present disclosure are very useful for pigmenting macromolecular organic and inorganic materials of any kind. Liquid application media in this context can be purely aqueous, comprise mixtures of water and organic solvents, for example alcohols, or be based exclusively on organic solvents, such as alcohols, glycol ethers, ketones, e.g. methylethyl ketone, amides, e.g. N-methylpyrrolidone and dimethyl formamide, esters, e.g. ethyl acetate, butyl acetate, and methoxypropyl acetate, or aromatic or aliphatic hydrocarbons, e.g. xylene, mineral oil, and mineral spirits.

Examples of materials which can be pigmented with the pigment preparations of the present disclosure include: coatings, for example architectural coatings, industrial coatings, automotive coatings, radiation-curable coatings, powder coatings; paints, including paints for building exteriors and building interiors, for example wood paints, lime washes, distempers, emulsion paints; solvent borne printing inks, for example offset printing inks, flexographic printing inks, toluene intaglio printing inks, textile printing inks, radiation-curable printing inks; water borne inks, including inkjet inks; color filters; building materials (water is typically added only after the building material and the pigment preparation have been dry-mixed), for example silicate render systems, cement, concrete, mortar, gipsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry; cosmetic articles; plastics; and detergents.

The pigment preparations of the present disclosure are particularly useful as mixing components in color-mixing or -matching systems. Owing to their stir-in characteristics, they can be used directly as a solid for this purpose. If desired, however, they may also be first converted into base colors, mixing varnishes, and tinting colors (especially into colors having a high solids content, "HS colors"), or even more highly pigmented tinting pastes, which then constitute the components of the mixing system. The matching of the desired hue and hence the mixing of the color components can be effected visually via a system of color cards in a very large number of hue gradations based on color standards, such as RAL, BS, and NCS, or typically under computer control, whereby an unlimited number of hues become accessible ("computer color matching").

The disclosure further relates to a coating formulation comprising at least one organic film forming binder which is different from the inventive dispersant composition, at least one pigment, and a pigment dispersant composition, wherein the pigment dispersant composition is a blend of fatty phosphate monoesters and diesters wherein the phosphate is neutralized with an nitrogen containing organic base as described above. It is typical that the coating formulation is an aqueous coating formulation. The coating formulation may for example be a base coat formulation, typically an aqueous base coat formulation. Base coat formulations are color- and/or effect-imparting coating formulations which are used in multilayer lacquer systems having a clear top coat. Such multilayer lacquer systems are frequently used to protect and decorate motor vehicles and large transportation vehicles. The coating formulation may further comprise other ingredients, additives or auxiliaries commonly used in coating formulations, such as dyes, levelling agents, organic solvents, wetting agents, anti-cratering agents, anti-foaming agents, antisagging agents, heat stabilizers, light stabilizers, UV absorbers, antioxidants, and fillers. It is also possible to use the pigment dispersant composition of the disclosure in combination with one or more other pigment dispersion aids and/or surfactants.

The dispersant composition according to the disclosure is also suitable for dispersing hydrophobic resins in aqueous systems. Therefore, the disclosure also relates to the use of the dispersant composition in a process for dispersing a hydrophobic resin in an aqueous system, and to an aqueous formulation comprising the polyurethane dispersant composition and at least one dispersed hydrophobic resin. Such a formulation can advantageously be used as a binder component in an aqueous two-component coating formulation.

The dispersant composition may also be used to disperse other hydrophobic and/or difficult-to-disperse materials in water. Examples of such other materials are additives and auxiliary materials, such as catalysts, UV-absorbers, and light stabilizers.

The compositions, formulations, and methods of the present disclosure are demonstrated by the following examples, which are presented by way of illustration and not by way of limitation.

Additional Embodiments

In one embodiment, the composition comprises a mixture of molecules of Formula (I):

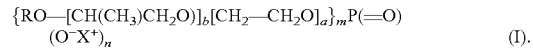

$$\{RO-[CH(CH_3)CH_2O)]_b[CH_2-CH_2O]_a\}_m P(=O)(O^-X^+)_n \quad (I).$$

This composition typically includes a mixture of both mono- and di-esters, wherein when m=1 and n=2, the molecule is a monoester, and when m=2 and n=1, the molecule is a diester. In Formula (I), R is chosen from linear or branched $C_{10}$-$C_{18}$ alkyl or alkenyl groups. For example, R can include about 10, 11, 12, 13, 14, 15, 16, 17, or 18 carbon atoms. In various embodiments, R can include 10 to 18, 11 to 17, 12 to 16, 13 to 15, 14 to 15, 12 to 18, 10 to 12, 10 to 16, 10 to 14, 10 to 13, 11 to 13, 11 to 14, 12 to 13, 12 to 16, 12 to 14, 14 to 18, 14 to 16, or 16 to 18, carbon atoms. Moreover, a is about 0 to about 50. In various embodiments, a is about 5 to 45, 10 to 40, 15 to 35, 20 to 30, or 25 to 30. In still other embodiments, a is from about 5 to about 30, about 10 to about 25, or about 15 to about 20.

Furthermore, b is 0 to 30. In various embodiments, b is 5 to 25, 10 to 20, or 15 to 20. In other embodiments, b is from about 5 to about 15, about 5 to about 10, or about 10 to about 15. In addition, a+b>0.

Still further, X+ is potassium, triethanolamine (TEA), or H (e.g. H+). In the composition, m and n are each equal to 1 or 2, such that when m=1 then n=2, and when m=2 then n=1. Also in the mixture, some of the molecules have m=1 and n=2 and some of the molecules have m=2 and n=1, wherein the mole ratio of compounds where m=1 to compounds where m=2 is of from 1:1 to 3:1. In various non-limiting embodiments, all values and ranges of values, both whole and fractional, between and including each of the aforementioned values, are hereby expressly contemplated for use herein.

In one embodiment, R is chosen from linear or branched $C_{10}$-$C_{13}$ alkyl or alkenyl groups, e.g. and has 10, 11, 12, or 13, carbon atoms. In another embodiment, a is from about 7 to about 20, e.g. 7, 8, 9, 10, 11, 12, 13, 14, 15, 16, 17, 18, 19, or 20. In still another embodiment, b is about 5 to about 15, e.g. 5, 6, 7, 8, 9, 10, 11, 12, 13, 14, or 15. In one embodiment, $X^+$ is potassium. In another embodiment, the mole ratio of compounds where m=1 to compounds where m=2 is of from 1.5:1 to 3:1, 2:1 to 3:1, 2.5:1 to 3:1. 1:1 to 3:1, 1:1 to 2.5:1, 1:1 to 2:1, 1:1 to 1.5:1, about 1:1, about 1.5:1, about 2:1, about 2.5:1, or about 3:1. In various non-limiting embodiments, all values and ranges of values, both whole and fractional, between and including each of the aforementioned values, are hereby expressly contemplated for use herein.

In another embodiment, $X^+$ is triethanolamine. In a further embodiment, R is a linear or branched $C_{10}$-$C_{13}$ alkyl group, e.g. and has 10, 11, or 12 carbon atoms. In a related embodiment, a is from about 7 to about 20. In another related embodiment, b is about 5 to about 15. In a further related embodiment, $X^+$ is potassium. Alternatively, $X^+$ can be H (e.g. $H^+$). In various non-limiting embodiments, all values and ranges of values, both whole and fractional, between and including each of the aforementioned values, are hereby expressly contemplated for use herein.

This disclosure also provides an agricultural composition that includes an agrochemical and the aforementioned composition comprising a mixture of molecules of Formula (I). The agricultural composition may be a solid or liquid and may be a solution, emulsion, or suspension. Moreover, the agricultural composition may be diluted or concentrated. In still other embodiments, the agricultural composition is an agricultural suspension concentrate formulation. In further embodiments, R is $C_{10}$ (which may be branched, not branched, or a mixture thereof), a is about 10, b is about 5, and the mole ratio may be as described above or may be from about 1:1 to about 2:1.

Compositions of the present disclosure ready for use (i.e., RTU compositions) can be prepared by diluting an aqueous herbicidal concentrate or dissolving a solid concentrate with an appropriate amount of water.

The agrochemical composition can be used as a ready to use (RTU) composition and/or can be used as a tank-mix additive or formulated in an in-can formulation. Other additives that can be present include, but are not limited to, defoamers, diluents, compatibility agents, biocides, thickeners, drift control agents, dyes, fragrances, and chelating agents. The use of a compatibility agent may not be necessary.

The use concentration of the mixture of compounds of Formula (I) in an in-can pesticide formulation is not particular limited. In various embodiments, the amount may be from about 0.005% to about 30%, typically about 0.05% to about 20%, and more typically about 0.5% to about 15% in weight %. The pesticide concentration is from about 5% to 65%, typically from 10% to 60%, and more typically from 30% to 55%, and still more typically from 40% to 55%, based on weight % active ingredient.

The use concentration of the mixture of compounds of Formula (I) in a tank mix pesticide spray solution is not particular limited. In various embodiments, the amount may be from about 0.001% to about 5%, typically about 0.01% to about 2%, and more typically about 0.075% to about 1% (in weight % mixture basis) in the total spray solution.

The agrochemical itself is not particularly limited and may be any known in the art. As used herein, an agrochemical is a chemical used in agricultural formulations. Non-limiting examples of agrochemicals include fertilizers, micronutrients, activator adjuvants or potentiators, drift control agents, emulsifiers, deposition aids, water conditioners, wetting agents, dispersants, compatibility agents, suspension aids, pesticides such as herbicides, fungicides, and insecticides, and growth inhibitors. When an agrochemical is described herein without specifying the counterions, it means both its acid form and salt form throughout the specification.

Suitable herbicides include, but are not limited to, acifluorfen, aclonifen, alachlor, ametryn, amidosulfuron, aminopyralid, amitrole, anilofos, asulam, atrazine, azafenidin, azimsulfuron, benazolin, benfluralin, bensulfuron-methyl, bentazone, bifenox, binalafos, bispyribac-sodium, bromacil, bromoxynil, butachlor, butroxidim, cafenstrole, carbetamide, carfentrazone-ethyl, chloridazon, chlorimuron-ethyl, chlorobromuron, chlorotoluron, chlorsulfuron, cinidon-ethyl, cinosulfuron, clethodim, clomazone, clopyralid, cloransulam-methyl, clorsulfuron, cyanazine, cycloate, cyclosulfamuron, cycloxydim, dalapon, desmedipham, dicamba, dichlobenil, dichlormid, diclosulam, diflufenican, dimefuron, dimepipeate, dimethachlor, dimethenamid, diquat, diuron, esprocarb, ethalfluralin, ethametsulfuron-methyl, ethofumesate, ethoxysulfuron, fentrazamide, flazasulfuron, florasulam, fluchloralin, flufenacet, flumetsulam, flumioxazin, fluometuron, flupyrsulfuron-methyl, flurochloridone, fluroxypyr, flurtamone, fomesafen, foramsulfuron, glufosinate, hexazinone, imazamethabenz-m, imazamox, mazapic, imazapyr, imazaquin, imazethapyr, imazosulfuron, iodosulfuron, ioxynil, isoproturon, isoxaben, isoxaflutole, Lactofen, lenacil, linuron, mefenacet, mesosulfuron-methyl, mesotrione, metamitron, metazachlor, methabenzthiazuron, metobromuron, metolachlor, metosulam, metoxuron, metribuzin, metsulfuron-methyl, molinate, MSMA, napropamide, nicosulfuron, norflurazon, oryzalin, oxadiargyl, oxadiazon, oxasulfuron, oxyfluorfen, paraquat, pendimethalin, phenmedipham, picloram, pretilachlor, profoxydim, prometryn, propanil, propisochlor, propoxycarbazone, propyzamide, prosulfocarb, prosulfuron, pyraflufen-ethyl, pyrazosulfuron, pyridate, pyrithiobac, quinclorac, quinmerac, rimsulfuron, sethoxydim, simazine, s-metolachlor, sulcotrione, sulfentrazone, sulfosulfuron, tebuthiuron, tepraloxydim, terbuthylazine, terbutryn, thifensulfuron-methyl, thiobencarb, tralkoxydim, tri-allate, triasulfuron, tribenuron-methyl, triclopyr, trifloxysulfuron, trifluralin, triflusulfuron-methyl, tritosulfuron, and mixtures and combinations thereof. In various embodiments, the herbicide is chosen from atrazine, dicamba, glufosinate, paraquat, 2,4-D and mixtures and combinations thereof. In various embodiments, the herbicide is chosen from 2,4-D, atrazine, dicamba, and glufosinate and mixtures and combinations thereof. In various embodiments, the herbicide is glufosinate. When the herbicide is an acid, it can be used in the acid form though it is typical that the herbicide be in the salt form selected from at least one of the group of an amine, lithium, sodium, ammonium or potassium. In various embodiments, the agrochemical is chosen from Diuron, Azoxystrobin, Captan, Atrazine, Tebuconazol. In other embodiments, the agrochemical is a solid water insoluble or sparingly soluble pesticide, as would be recognized by one of skill in the art.

Examples of suitable fungicides include, but are not limited to, acibenzolar-S-methyl, aldimorph, amisulbrom, anilazine, azaconazole, azoxystrobin, benalaxyl, benodanil, benomyl, benthiavalicarb, binapacryl, biphenyl, bitertanol, blasticidin-S, boscalid, bromuconazole, bupirimate, captafol, captan, carbendazim, carboxin, carpropamid, chloroneb, chlorothalonil, chlozolinate, copper, cyazofamid, cyflufenamid, cymoxanil, cyproconazole, cyprodinil, dichlofluanid, diclocymet, diclomezine, dicloran, diethofencarb, difenoconazole, diflumetorim, dimethirimol, dimethomorph, dimoxystrobin, diniconazole, dinocap, dithianon, dodemorph, dodine, edifenphos, enestrobin, epoxiconazole, etaconazole, ethaboxam, ethirimol, etridiazole, famoxadone, fenamidone, fenarimol, fenbuconazole, fenfuram, fenhexamid, fenoxanil, fenpiclonil, fenpropidin, fenpropimorph, fentin acetate, fentin chloride, fentin hydroxide, ferbam, ferimzone, fluazinam, fludioxonil, flumorph, fluopicolide, fluoxastrobin, fluquinconazole, flusilazole, flusulfamide, flutolanil, flutriafol, folpet, fosetyl-Al, fthalide, fuberidazole, furalaxyl, furametpyr, guazatine, hexaconazole, hymexazole, imazalil, imibenconazole, iminoctadine, iodocarb, ipconazole, iprobenfos (IBP), iprodione, iprovalicarb, isoprothiolane, isotianil, kasugamycin, kresoxim-methyl, laminarin, mancozeb, mandipropamid, maneb, material of biological, mepanipyrim, mepronil, meptyldinocap, metalaxyl, metalaxyl-M, metconazole, methasulfocarb, metiram, metominostrobin, metrafenone, mineral oils, organic oils, myclobutanil, naftifine, nuarimol, octhilinone, ofurace, origin, orysastrobin, oxadixyl, oxolinic acid, oxpoconazole, oxycarboxin, oxytetracycline, pefurazoate, penconazole, pencycuron, penthiopyrad, phophorous acid and, picoxystrobin, piperalin, polyoxin, potassium bicarbonate, probenazole, prochloraz, procymidone, propamocarb, propiconazole, propineb, proquinazid, prothiocarb, prothioconazole, pyraclostrobin, pyrazophos, pyribencarb, pyributicarb, pyrifenox, pyrimethanil, pyroquilon, quinoxyfen, quintozene (PCNB), salts, silthiofam, simeconazole, spiroxamine, streptomycin, sulphur, tebuconazole, teclofthalam, tecnazene (TCNB), terbinafine, tetraconazole, thiabendazole, thifluzamide, thiophanate, thiophanate-methyl, thiram, tiadinil, tolclofosmethyl, tolylfluanid, triadimefon, triadimenol, triazoxide, tricyclazole, tridemorph, trifloxystrobin, triflumizole, triforine, triticonazole, validamycin, valiphenal, vinclozolin, zineb, ziram, and zoxamide, and mixtures and combinations thereof.

Examples of suitable insecticides include, but are not limited to, kerosene or borax, botanicals or natural organic compounds (nicotine, pyrethrin, strychnine and rotenone), chlorinated hydrocarbon (DDT, lindane, chlordane), organophosphates (malathion and diazinon), carbamates (carbaryl and propoxur), fumigants (naphthalene) and benzene (mothballs), synthetic pyrethroids, and mixtures and combinations thereof.

Various other embodiments of the present disclosure are directed to formulations comprising one of the aforementioned agrochemicals with one or more other active ingredients. These other active ingredients can include those generally known in the art including, for example, coherbicides, fungicides, and plant health agents such as those described elsewhere herein. An agrochemical composition according to the disclosure can optionally comprise other additives such as ammonium sulfate, potassium sulfate, potassium chloride, sodium sulfate, urea, glycerol, glycols, polyglycols, or mixtures thereof. Generally, any second active agent comprises from about 5 to about 90 wt. % or from about 5 to about 50 wt. % of the agrochemical composition. Typically, the second active agent comprises from about 5 to about 35 wt. % and, still more typically, from about 10 to about 30 wt. % of the composition. Further in accordance with those embodiments including agrochemical and a second active agent, the weight ratio of agrochemical to second active agent generally is from about 1:1 to about 10:1, from about 1:1 to about 6:1, or from about 2:1 to about 6:1.

In various embodiments, the agrochemical loading of the agrochemical composition is at least about 180 g a.e./L, at least about 220 g a.e./L, at least about 260 g a.e./L, at least about 300 g a.e./L, at least about 320 g a.e./L, at least about 360 g a.e./L, at least about 400 g a.e./L, at least about 480 g a.e./L, at least about 500 g a.e./L, at least about 540 g a.e./L, or at least about 600 g a.e./L.

In other embodiments, the agrochemical composition includes a concentration of agrochemical of from about 360 to about 600 g a.e./L, typically from about 450 to about 580 g a.e./L. Generally, these formulations contain agrochemical (a.e.) at a concentration of from about 1 to about 65 wt. % or from about 1 to about 60 wt. %. Typically, these formulations contain agrochemical (a.e.) at a concentration of from about 15 to about 50 wt. % or from about 25 to about 50 wt. %.

In still other embodiments, a weight ratio of agrochemical (a.e.) to the mixture of compounds of Formula (I) is from about 1:1 to about 100:1, or from about 1:1 to about 50:1. In various embodiments, the weight ratio of these components is from about 1:1 to about 30:1 or from about 1:1 to about 20:1. In other embodiments, the weight ratio is between about 1:1 and about 30:1 or between about 2:1 and about 25:1 (e.g., typically between about 2.5:1 and about 20:1, between about 1:1 and about 15:1, between about 2:1 and about 10:1, between about 3:1 and about 15:1, or between about 3.5:1 and about 8:1). In other embodiments, the weight ratio of these components is from about 1:1 to about 15:1, more typically from about 1:1 to about 10:1 and, still more typically, from about 1:1 to about 8:1 (e.g., from about 1:1 to about 6:1, or from about 1:1 to about 4:1). In still other embodiments, the weight ratio of agrochemical (a.e.) to total proportion of the mixture of compounds of Formula (I) is from about 3:1 to about 5:1, or from about 3:1 to about 4:1. In other embodiments, the concentration of agrochemical is in the range of from about 360 to about 600 g a.e./L, and the weight ratio of agrochemical (wt. % a.e.) to the mixture of compounds of Formula (I) is between about 2:1 and about 25:1 (e.g., between about 2.5:1 and about 20:1, or between about 3.5:1 and about 8:1.

In other embodiments, other agrochemicals can be used including, for example, 2,4-dichlorophenoxyacetic acid (2,4-D), dicamba, and glufosinate. Each can be used individually or in combination with one or more others. In other embodiments, the agrochemical is chosen from diuron, captan, atrazine, and combinations thereof. Each can be used individually or in combination with one or more others.

In various embodiments, a weight ratio of agrochemical (a.e.) to one or more coherbicides is typically from about 9:1 to 1:9, more typically 5:1 to 1:5, or 2:1 to 1:2.

In one embodiment, R is R=C13; a=13 (EO); b=6 (PO); and X$^+$=H. In a related embodiment, the agrochemical is Captan.

In another embodiment, R=C13; a=10 (EO); b=5 (PO); and X$^+$=TEA. In a related embodiment, the agrochemical is Captan.

In another embodiment, R=C13; a=10 (EO); b=5 (PO); and X$^+$=TEA. In a related embodiment, the agrochemical is Diuron SC. The composition may also include, or be free of, Xanthan, e.g. 0.1% Xanthan.

In another embodiment, R=C13; a=10 (EO); b=5 (PO); and X$^+$=TEA. In a related embodiment, the agrochemical is Diuron SC. The composition may also include, or be free of, Xanthan, e.g. 0.1% Xanthan.

In another embodiment, R=C13; a=5 (EO); b=5 (PO); and X$^+$=TEA. In a related embodiment, the agrochemical is Diuron.

In another embodiment, R=C13; a=10 (EO); b=5 (PO); and X$^+$=TEA. In a related embodiment, the agrochemical is Diuron.

In another embodiment, R=C10; a=5 (EO); b=5 (PO); and X$^+$=TEA. In a related embodiment, the agrochemical is Diuron.

In another embodiment, R=C10; a=10 (EO); b=5 (PO); and X$^+$=TEA. In a related embodiment, the agrochemical is Diuron.

In another embodiment, R=C10; a=10; b=5; and X$^+$=K. In a related embodiment, the agrochemical is Diuron.

In another embodiment, R=C10; a=10; b=5; and X$^+$=TEA. In a related embodiment, the agrochemical is Diuron.

Co-surfactants can also be present in the agrochemical composition and may be anionic, nonionic, and/or amphoteric, or combinations thereof.

Non-limiting examples of typical cationic surfactants are alkoxylated alkylamine and its quaternary derivative, alkoxylated etheramine and its quaternary derivative, alkoxylated alkyl amines and oxides, alkoxylated alkyl etheramines and oxides, alkyl amidopropyl amines and oxide, alkyl trimethyl ammonium chloride, and alkyl (typically $C_6$ to $C_{10}$) dimethylamidopropylamine.

Non-limiting examples of typical anionic surfactants are alkylsulfate, alkylethersulfate, alkylsulfonate, alkylsulfosuccinate, alkoxylated phosphate ester, alkyl alpha olefin sulfonate, alkyl n-methyl taurate, fatty acid isethionate, and alkyl ether carboxylate.

Non-limiting examples of typical nonionic surfactants are alkoxylated mono and/or diglycerides, sorbitan ester and its alkoxylated derivative, sorbitol ester and its alkoxylated derivative, fatty acid ester, castor oil alkoxylate, alcohol alkoxylate, alkanolamide, alkanolamide alkoxylate, and alkyl polyglycoside.

Non-limiting examples of typical amphoteric surfactants are alkyl betaine, alkyl amidopropyl betaine, alkylamphoacetate, alkylamphodiacetate, alkylamphocarboxylate, alkylamphopropionate, alkylamphodipropionate, alkyl amidoamine carboxylate, alkylamphohydroxypropyl sulfonate, alkyl sultaine, alkyl amidopropyl hydroxyl sultaine, alkyl dihydroxyethyl glycinate, and alkyl aminopropionate.

The compositions of the present disclosure can be used to kill or control the growth of a wide variety of plants.

Generally, various embodiments of the present disclosure are directed to methods for controlling unwanted vegetation comprising applying an effective amount of the herbicidal formulation to the unwanted vegetation. The agrochemical composition of the disclosure should be applied to plant foliage at an application rate sufficient to give the desired effect. Application rates are usually expressed as amount of agrochemical ae per unit area of land treated, e.g. grams ae per hectare (g a.e./ha). Suitable efficacious application or spray rates used in the practice of the present disclosure will vary depending on the particular composition and concentration of active ingredients, the desired effects, plant species treated, weather and other factors. What constitutes a "desired effect" varies according to the standards and practice of those who investigate, develop, market, and use agrochemical products. For example, the amount of agrochemical a.e. applied per unit area to give, consistently and reliably, at least 70%, more typically at least 85% control of a plant species as measured by growth reduction or mortality is often used to define a commercially effective rate.

Typical compositions of the disclosure provide equivalent herbicidal efficacy by comparison with commercial standard formulations of agrochemical. "Herbicidal efficacy," as used herein, refers to any observable measure of control of plant growth, which can include one or more of the actions of (1) killing, (2) inhibiting growth, reproduction or proliferation, and (3) removing, destroying, or otherwise diminishing the occurrence and activity of plants.

The selection of application rates that are biologically effective for a specific agrochemical composition, such as a formulation of the present disclosure, is within the skill of the ordinary agricultural scientist. Those skilled in the art will likewise recognize that individual plant conditions, weather, and growing conditions, as well as the specific formulation selected, will influence the degree of biological effectiveness achieved in practicing this disclosure. Useful application rates can therefore depend upon all of the above conditions. Much information is known about appropriate application rates for agrochemical compositions in general. Over two decades of agrochemical use and published studies relating to such use have provided abundant information from which a weed control practitioner can select agrochemical application rates that are herbicidally effective on particular species at particular growth stages in particular environmental conditions.

Various application methods may be employed including broadcast spraying, directed spraying or wiping the foliage with a diluted composition of this disclosure. Depending on the degree of control desired, the age and species of the plants, weather conditions and other factors, typically the agrochemical application rate is an herbicidally effective amount of about 0.1 to about 10 kg a.e./ha and typically from about 0.25 to about 2.5 kg a.e./ha, although greater or lesser amounts may be applied.

In still other embodiments, this disclosure provides an agricultural suspension concentrate formulation comprising a solid water insoluble or sparingly soluble pesticide and the mixture of molecules of Formula (I). The solid water insoluble or sparingly soluble pesticide may be any described above known to those skilled in the art. Moreover, in related embodiments, R is a $C_{10}$ branched alkyl or alkenyl groups, a is about 10 and b is about 5, X$^+$ is potassium, triethanolamine, or H (e.g. H$^+$), m and n are each equal to 1 or 2, such that when m=1 then n=2, and when m=2 then n=1; and in the mixture some of the molecules have m=1 and n=2 and some of the molecules have m=2 and n=1, wherein the mole ratio of compounds where m=1 to compounds where m=2 is of from about 1:1 to about 2:1. In related embodiments, the formulation may consist essentially of the solid water insoluble or sparingly soluble pesticide and the mixture of molecules of Formula (I) and exclude one or more optional components described herein, one or more surfactants, one or more agrochemicals either described herein or known in the art, etc.

EXAMPLES

Preparation of the Dispersant Compositions

In one exemplary procedure of the method of making the dispersant compositions of the present disclosure,
(i) an alkyl or alkenyl alcohol of formula R—OH is provided having the desired linear or branched alkyl or alkenyl moiety, and is catalyzed with potassium hydroxide,
(ii) calculated amounts of propylene oxide are added at 120-130° C. and polymerized for 2 to 8 hrs to form a first intermediate of the formula RO—[CH(CH$_3$)CH$_2$O]$_b$—,
(iii) calculated amounts of ethylene oxide are added to the first intermediate and polymerized at 160-170° C. for 0.5 to 2 hours to form a second intermediate of formula RO—[CH(CH$_3$)CH$_2$O]$_b$[CH$_2$—CH$_2$O]$_a$—,
(iv) the second intermediate is charged with a small amount of methane sulfonic acid as a catalyst and heated to 55-60° C., then phosphorus pentoxide is added and the temperature is allowed to go up to 58-75° C. over a period of about 1.5 hour, and then heated to 120° C. for 2-3 hours to form a blend of phosphate mono- and di-esters of the formula {RO—[CH(CH$_3$)CH$_2$O]$_b$[CH$_2$—CH$_2$O]$_a$}$_m$P(=O)(OH)$_n$, and
(v) the resulting alkoxylated phosphate ester blends are reacted with the desired counter-ion X, or a precursor thereof, to neutralize the hydroxyl group or groups on the phosphorous atom. The reaction is conducted at room temperature, and continues until the pH of the reaction mixture is at or near 7.

In accordance with steps (i)-(iv) of the procedure above eight phosphate ester blends were prepared. Table A below indicates the fatty alcohol used, whether the polyoxyalkylene was propoxy and ethoxy or ethoxy only, and the composition of the blend in terms of monoester, diester, residual phosphoric acid, and residual alcohol. The mole % of propoxy groups and ethoxy groups was determined by NMR.

The phosphate ester blends of Table A were reacted with various counter-ions X to reach pH at 7 at room temperature, thereby obtaining the dispersant compositions identified in Table B, wherein "APA" indicates dimethylaminopropylamide.

TABLE B

| Dispersant Composition | Phosphate ester blend | Counter ion "X" |
|---|---|---|
| 1 | 7 | Morpholine |
| 2 | 7 | Caprylic & Capric APA |
| 3 | 7 | Coco APA C |
| 4 | 7 | Caproic APA |
| 5 | 7 | Potassium |
| 6 | 4 | Potassium |
| 7 | 1 | Potassium |
| 8 | 3 | Potassium |
| 9 | 8 | Potassium |
| 10 | 5 | Potassium |
| 11 | 6 | Potassium |
| 12 | 1 | Caproic APA |
| 13 | 1 | Morpholine |
| 14 | 1 | none[a] |
| 15 | 5 | Morpholine |
| 16 | 4 | Caproic APA |
| 17 | 4 | Morpholine |
| 18 | 4 | Caproic APA |
| 19 | 2 | Potassium |
| 20 | 3 | Morpholine |

[a]comparative example

Preparation and Evaluation of Dispersion Formulations

A quantity of a dispersant composition of Table 2 was first dissolved at 2-5% by weight in the intended liquid medium (water or solvent). Subsequently, solid particulates were slowly added to the solutions under gentle mechanical stirring (wt % varies from 5% to 60% depending on the solid particulates), then the mixture was agitated by ultrasonic processer (Hielscher UP200S) at 65% amplitude for 15 min. Particle size distributions have been traditionally calculated based on sieve analysis results, creating an S-curve of cumulative mass retained against sieve mesh size, and calculating the intercepts for 10%, 50% and 90% mass. In these examples the dispersion particle size and distributions were analyzed by laser light diffraction (MicroTrac FRA 9200) and reported as D values, where D10, D50 and D90 represent the midpoint and range of the particle sizes of a

TABLE A

| | | Component (Mol %) | | | | | |
|---|---|---|---|---|---|---|---|
| Phosphate Ester Blend | | ROP=O(OH)2 | (RO)2P=O(OH) | H3PO4 | ROH | EO # | PO # |
| R = 2-ethylhexyl; (PO)b(EO)a | Blend #1 | 63.3 | 32.3 | 4.4 | n.d.* | 13.7 | 4.9 |
| R = isotridecyl; (PO)b(EO)a | Blend #2 | 54.3 | 34.5 | 3.7 | 7.1 | 16.0 | 7.5 |
| | Blend #3 | 50.8 | 32.0 | 10.2 | 6.0 | 12.7 | 5.4 |
| | Blend #4 | 54.6 | 34.6 | 2.1 | 8.8 | 10.2 | 2.5 |
| R = isotridecyl; (EO)a | Blend #5 | 64.4 | 25.7 | 5.6 | 4.2 | 10.2 | |
| | Blend #6 | 50.4 | 20.6 | 3.8 | 25.3 | 10.0 | |
| | Blend #7 | 60.8 | 16.3 | 6.3 | 14.0 | 10.0 | |
| | Blend #8 | 58.4 | 24.9 | 11.5 | 5.2 | 10.1 | |

*not detectable given sample. Smaller particle sizes in the dispersion formulation indicate the absence of particle agglomeration, which indicates that a better dispersion is achieved and maintained. The dispersion rheology was evaluated by Malvin Kinexus Ultra Rheometer at room temperature. A more shear independent rheology indicates better dispersion properties.

Example 1

Iron Oxide Dispersion Formulations

The dispersion formulations in this Example 1 were prepared using an iron oxide pigment sold under the name "Ferroxide™" and available from Huntsman Corporation, The Woodlands, Tex., except where otherwise indicated.

In dispersant compositions 9-11 of Table B, R of Formula (I) is isotridecyl, the polyoxyalkyene group is polyethoxylene, and the counter-ion "X" is an alkali metal cation, namely, K+. Dispersion concentrate formulations were prepared comprising 49.9% Ferroxide™ and 2.4% by weight of dispersant composition using water as the medium, and mixed as described above. The particle size distribution of each formulation was evaluated. The results are shown in Table 1.

TABLE 1

Particle size distribution of iron oxide pigment dispersion concentrate (49.9% in water with 2.4% dispersant)

| Dispersion Formulation | Dispersant Composition | Ratio of monoester to diester | D10 (μm) | D50 (μm) | D90 (μm) |
|---|---|---|---|---|---|
| 101 | 9 | 2.35 | 0.18 | 0.43 | 0.82 |
| 102 | 10 | 2.51 | 0.17 | 0.41 | 0.81 |
| 103 | 11 | 2.45 | 0.19 | 0.48 | 1.02 |

In dispersant compositions 1-4 of Table B, R of Formula (I) is isotridecyl, the polyoxyalkyene group is polyethoxylene, and the counter-ion X is chosen from morpholinyl and various fatty dimethylaminopropylamides. Dispersion formulations were prepared comprising 10% or 40% of "Ferroxide" iron oxide pigment, 2.4% by weight of the dispersant composition, and the balance water, and mixed as described above. The particle size distribution of each formulation was evaluated. The results are shown in Table 2.

TABLE 2

Particle size distribution of iron oxide pigment in aqueous dispersion formulations

| Dispersion Formulation | Dispersant Composition | Counter-ion | wt % iron oxide pigment | D10 (μm) | D50 (μm) | D90 (μm) |
|---|---|---|---|---|---|---|
| 104 | 1 | morpholinyl | 10% | 0.14 | 0.22 | 0.36 |
| 105 |   |   | 40% | 0.14 | 0.21 | 0.35 |
| 106 | 2 |   | 10% | 0.14 | 0.21 | 0.36 |
| 107 |   | Caprylic and capric APA | 40% | 0.14 | 0.24 | 0.69 |
| 108 | 3 | Coco APA C | 10% | 0.18 | 0.55 | 2.48 |
| 109 |   |   | 40% | 0.21 | 0.63 | 2.53 |
| 110 | 4 | Caproic APA | 10% | 0.14 | 0.22 | 0.36 |
| 111 |   |   | 40% | 0.14 | 0.26 | 0.71 |

Dispersion formulations were prepared comprising 40% Ferroxide™ pigment with varying amounts of dispersant composition 4 wherein R of Formula (I) is isotridecyl, the polyoxyalkyene group is polyethoxylene, and the counter-ion X is caproic APA, in water medium; the amount of dispersant composition used is expressed as a weight percent based on the Ferroxide. The formulations were mixed as described above. The particle size distribution of each formulation was evaluated. The results are shown in Table 3.

TABLE 3

Particle size distribution of iron oxide pigment with dispersant #4 in aqueous dispersion formulations

| Dispersion Formulation | t % dispersant based on pigment | D10 (μm) | D50 (μm) | D90 (μm) |
|---|---|---|---|---|
| 112 | 0 | 0.37 | 0.91 | 2.13 |
| 113 | 4% | 0.16 | 0.49 | 2.27 |
| 114 | 6% | 0.14 | 0.30 | 0.91 |
| 115 | 8% | 0.14 | 0.27 | 0.80 |
| 116 | 10% | 0.14 | 0.26 | 0.71 |
| 117 | 12% | 0.15 | 0.30 | 0.76 |

Dispersion formulations were prepared comprising 49.9% of a pigment concentrate sold under the name Rockwood Red (Rockwood Pigments, now Huntsman Corporation) with 2.4% of the indicated dispersant composition in a water medium, and mixed as described above. The particle size distribution of each formulation was evaluated. The results are shown in Table 4.

TABLE 4

Particle size distribution of iron oxide pigment in aqueous dispersion formulations

| Dispersion Formulation | Dispersant Composition | D10 (μm) | D50 (μm) | D90(μm) |
|---|---|---|---|---|
| 118 | 7 | 0.14 | 0.34 | 0.68 |
| 119 | 6 | 0.11 | 0.29 | 0.60 |
| 120 | 10 | 0.16 | 0.26 | 0.43 |
| 121 | 8 | 0.10 | 0.11 | 0.32 |
| 122 | 9 | 0.13 | 0.21 | 0.51 |
| 123 (comparative) | Dispersogen ® LFH[a] | 0.14 | 0.22 | 0.45 |

[a]Dispersogen ® LFH is an anionic dispersing agent available from Clariant

Dispersion formulations were prepared comprising 49% by weight of Rockwood Red iron oxide pigment using four different dispersant compositions at concentrations ranging from 0.50%-3.00%. Two of the dispersant compositions used were dispersant compositions 7 and 8 of Table B, and two of the dispersant compositions were commercially available products, namely Dispersogen® LFH available from Clariant and Nuosperse® FA196 available from Elementis Specialties Netherlands B.V. The viscosities of the samples were evaluated. The results are illustrated in FIG. 1.

Example 2

Titanium Dioxide Dispersion Formulations

The dispersion formulations in this Example 2 were prepared using a titanium dioxide pigment sold under the name "Titanium Oxide W946" and available from AkzoNobel.

Dispersion concentrate formulations were prepared comprising 49.9% titanium dioxide pigment material and 2.4% by weight of dispersant composition using water as the medium, and mixed as described above. A comparative formulation was prepared using Nuosperse® FA 196 dispersant. The particle size distribution of each formulation was evaluated. The results are shown in Table 5.

TABLE 5

Particle size distribution of TiO$_2$ (49 wt %) dispersion with 2.4% dispersant

| Dispersion Formulation | Dispersant Composition | D10 (μm) | D50 (μm) | D90 (μm) |
|---|---|---|---|---|
| 124 (comparative) | Nuosperse ® FA 196 | 0.19 | 0.35 | 0.67 |
| 125 | 12 | 0.16 | 0.34 | 0.97 |
| 126 | 16 | 0.21 | 0.40 | 1.09 |
| 127 | 18 | 0.18 | 0.36 | 0.86 |
| 128 | 13 | 0.20 | 0.38 | 0.88 |
| 129 | 17 | 0.18 | 0.35 | 0.73 |
| 130 | 15 | 0.18 | 0.35 | 0.74 |
| 131 | 7 | 0.19 | 0.35 | 0.73 |
| 132 | 6 | 0.18 | 0.35 | 0.74 |
| 133 | 10 | 0.20 | 0.38 | 0.81 |
| 134 | 14 | 0.22 | 0.40 | 0.90 |

Figure 2:
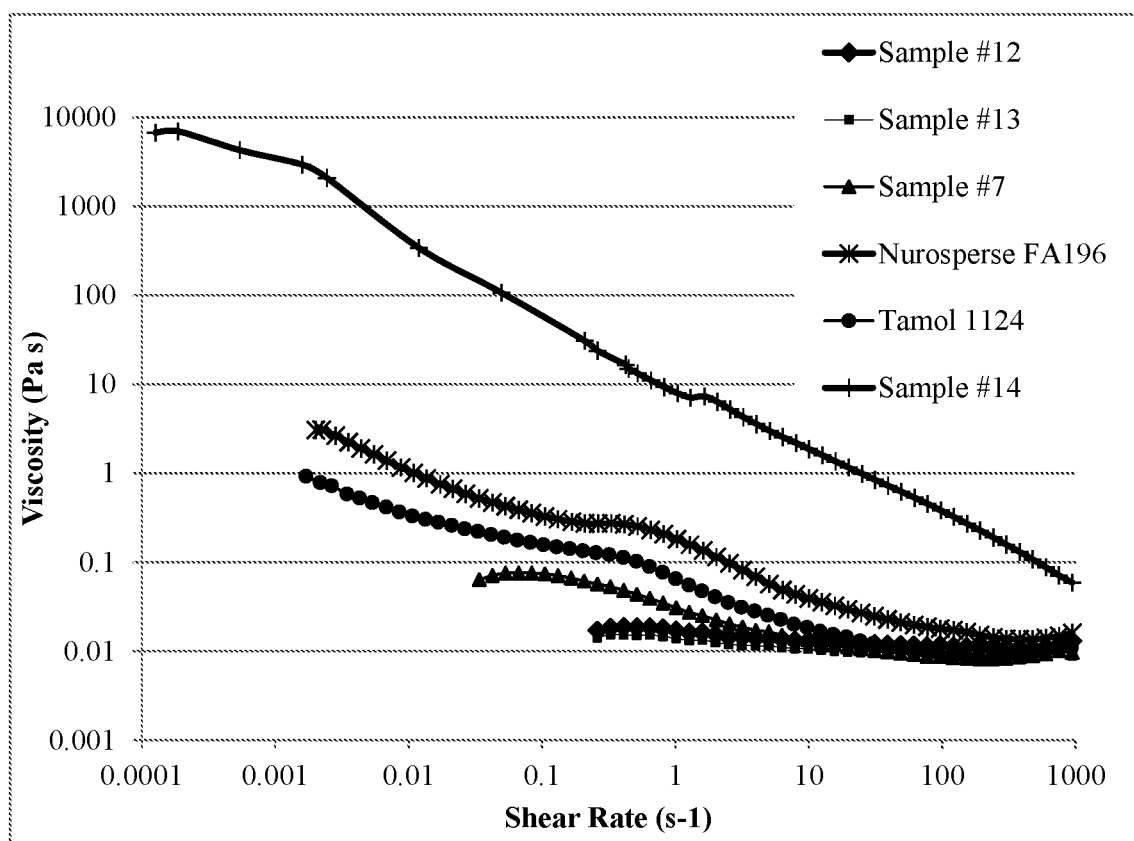
FIG. 2 is a graph of viscosity vs. shear rate for six different dispersants at a concentration of 2.4 wt % using a titanium dioxide pigment loaded at 49% in water.

A comparative formulation was prepared using 49 wt % of the titanium dioxide in water with 2.4% of Tamol™ 1124 dispersant available from the Dow Chemical Company. The rheology of this formulation and dispersion formulations 124, 125, 128, 131 and 134 of Table 5 were evaluated. The results are illustrated in FIG. 2. The formulations of the present disclosure give the flattest curves, indicating more near-Newtonian rheologies than are provided by the dispersants of the prior art.

Dispersion formulations were prepared comprising 75 wt % titanium dioxide, 23% water, and 2% of either Tamol™ 1124 dispersant or the dispersant composition 12 of Table B. The formulations were stored at room temperature for four months, after which it was determined how much of each formulation was pourable. The results are presented in Table 6.

TABLE 6

Pourability of 75% of TiO$_2$ dispersion formulation with either Sample#12 or Tamol 1124 dispersant (Dow Chemicals) in 23% of water.

| Dispersant (2%) | Pourable amount (wt %) after stored at RT for 4 months |
|---|---|
| Dispersant #12 | 86.9 |
| Tamol ™ 1124 (comparative) | 26.41 |

Example 3

Carbon Black Dispersion Formulations

The dispersion formulations in this Example were prepared using Vulcan® XC-72 carbon black concentrate pigment available from Cabot Corporation.

Dispersion formulations were prepared comprising 15% of the carbon black pigment material and 5% by weight of selected dispersant compositions of Table B using water as the medium, and mixed as described above. The particle size distribution of each formulation was evaluated. The results are shown in Table 7.

TABLE 7

Particle size distribution of Vulcan ® XC-72 carbon black concentrate (15 wt % with 5% dispersant)

| Dispersant Formulation | Dispersant Composition | D10 (μm) | D50 (μm) | D90 (μm) |
|---|---|---|---|---|
| 135 | 7 | 0.22 | 0.53 | 1.49 |
| 136 | 13 | 0.23 | 0.44 | 3.63 |
| 137 | 10 | 0.18 | 0.49 | 5.58 |
| 138 | 15 | 0.21 | 0.44 | 3.66 |

The results clearly indicated that the 15 wt % Vulcan® XC-72 concentrate is achievable by using the indicated dispersant compositions of the present disclosure.

Figure 3:
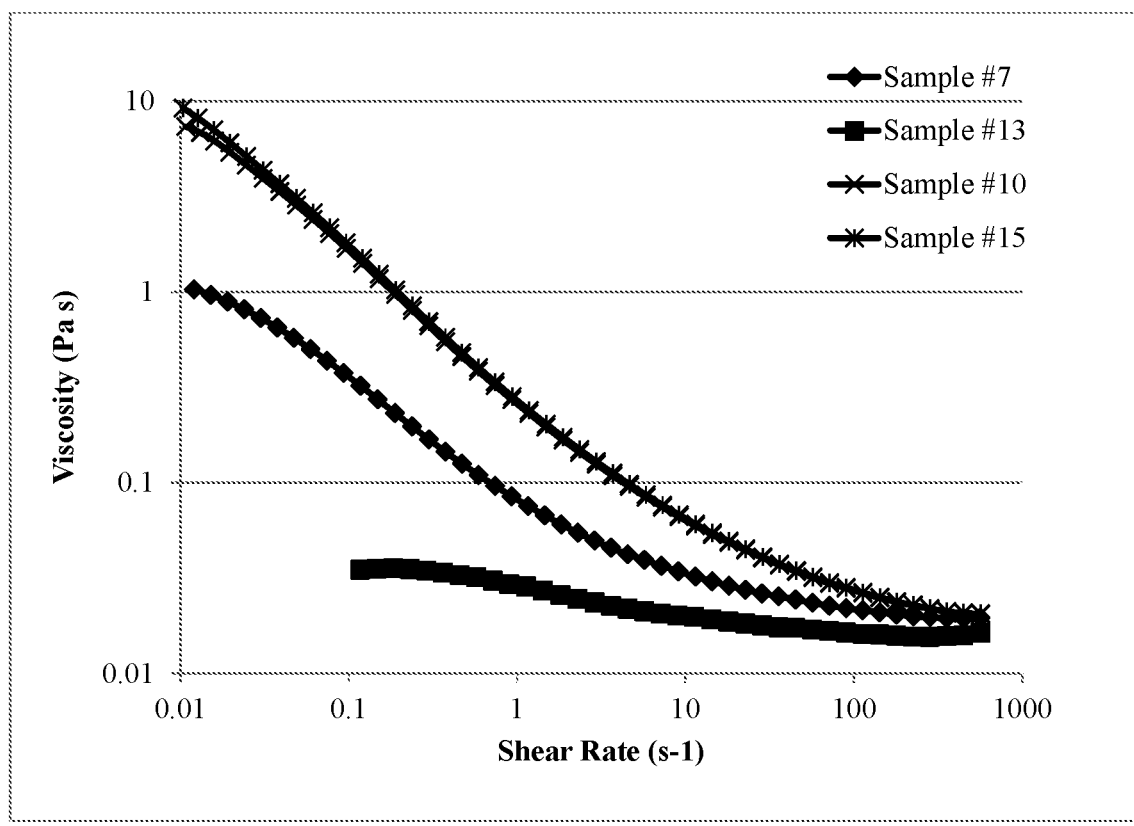
FIG. 3 is a graph of viscosity vs. shear rate for four different dispersants at a concentration of 5.0 wt % using carbon black concentrate pigment loaded at 15% in water.

The rheologies of the four dispersion formulations of Table 8 were evaluated. The results are illustrated in FIG. 3. The dispersion formulation made with dispersant composition 13 exhibited an almost Newtonian rheology profile.

Example 4

Yellow Oxide Dispersion Formulations

The dispersion formulations in this Example 4 were prepared using a yellow oxide pigment sold under the name Rockwood Yellow Oxide 0348 (Rockwood Pigments, now Huntsman Corporation).

Figure 4:
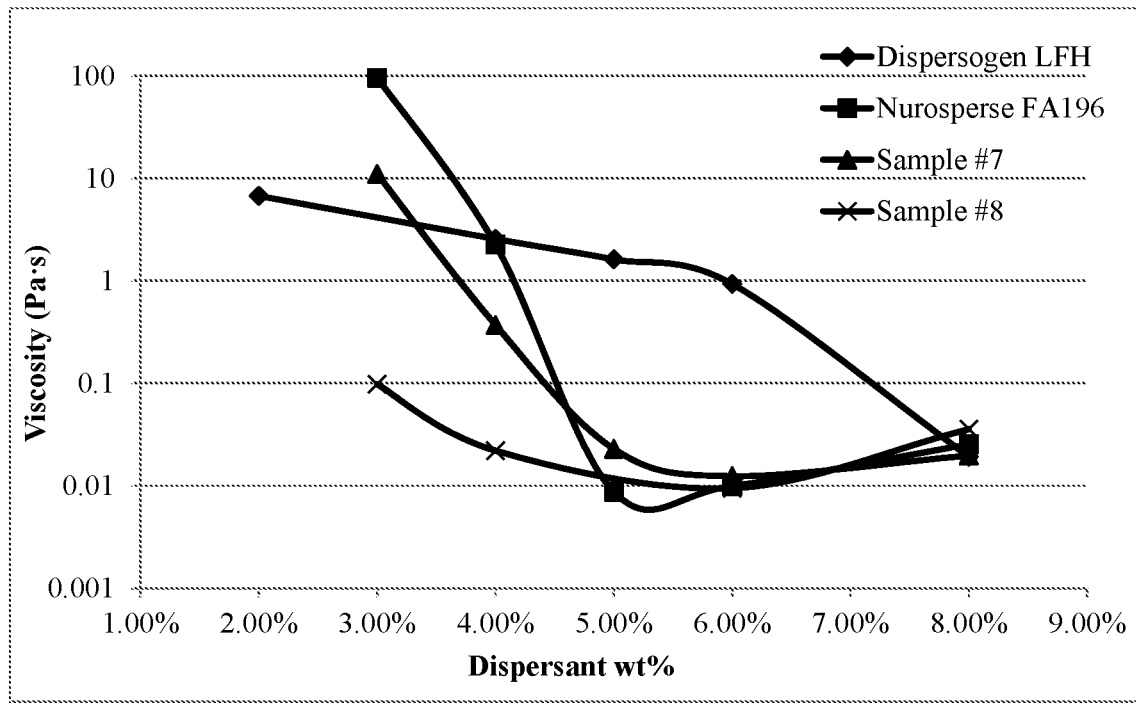
FIG. 4 is a graph of a dispersant demand curve comparing viscosity vs. dispersant wt % for four different dispersants using a yellow oxide pigment loaded at 36% in water.

Dispersion formulations were prepared comprising 36% of yellow oxide pigment and varying amount of dispersant compositions in water medium. The dispersant compositions used were Compositions 7 and 8 of Table B, and comparative dispersant compositions Nuosperse® FA196 and Dispersogen® LFH. The concentration of the dispersant compositions in the dispersion formulations ranged from 2.00% to 8.00%. The viscosity of each sample was measured. The results are illustrated in FIG. 4.

Dispersion formulations were prepared comprising 41.4 wt % yellow oxide pigment with 2.7 wt % of various dispersant compositions in water medium. The dispersant compositions used included three dispersant compositions of the present disclosure and two commercially available dispersant compositions. The particle size distributions of each of the formulations is presented in Table 8.

TABLE 8

Particle size distribution of the Yellow Oxide pigment concentrates (41.4%) with 2.7% of dispersant

| Dispersion Formulation | Dispersant Composition | D10 (μm) | D50 (μm) | D90 (μm) |
|---|---|---|---|---|
| 139 (comparative) | Nuosperse ® FA 196 | 0.16 | 0.27 | 0.57 |
| 140 (comparative) | Dispersogen ® LFH | 0.17 | 0.36 | 0.78 |
| 141 | 10 | 0.15 | 0.29 | 0.67 |
| 142 | 6 | 0.15 | 0.26 | 0.58 |
| 143 | 7 | 0.17 | 0.42 | 2.63 |

Figure 5:
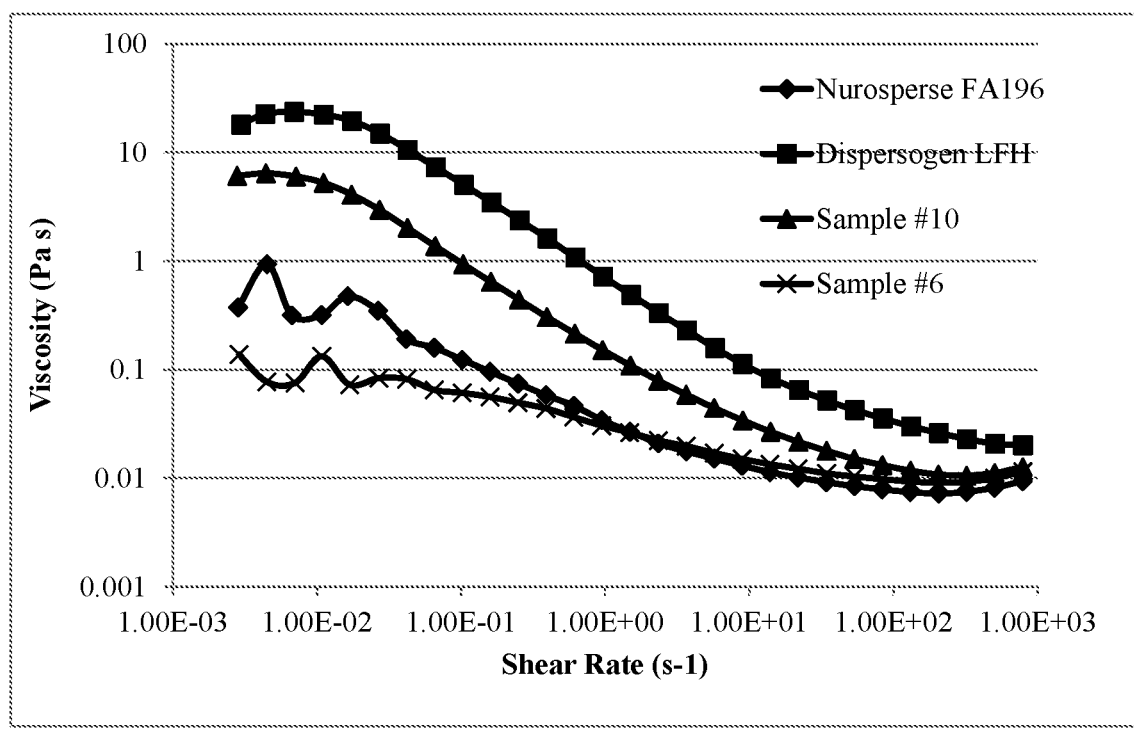
FIG. 5 is a graph of viscosity vs. shear rate for four different dispersants at a concentration of 2.7 wt % using a yellow oxide pigment loaded at 41.4% in water.

The rheologies of the first four formulations of Table 9 were evaluated. The data is presented in FIG. 5.

Example 5

Copper Phthalocyanine Blue Dispersion Formulations

The dispersion formulations in this Example 5 were prepared using a copper phthlaocyanine blue pigment sold under the name Heliogen® Blue L-7085 available from BASF, and Copper Phthalocyanine Blue A193 available from AkzoNobel.

Dispersion formulations were prepared comprising 30% Heliogen Blue copper phthalocyanine blue pigment material and 2.4% by weight of selected dispersant compositions using water as the medium, and mixed as described above. The particle size distribution of each formulation was evaluated. The results are shown in Table 9.

TABLE 9

Particle size and distribution of BASF Heliogen Blue L-7085 pigment material (30%) dispersion with 2.4% dispersant composition

| Dispersion Formulation | Dispersant Composition | D10 (μm) | D50 (μm) | D90 (μm) |
|---|---|---|---|---|
| 144 | 7 | 0.13 | 0.22 | 0.69 |
| 145 | 6 | 0.10 | 0.12 | 0.51 |
| 146 | 10 | 0.11 | 0.14 | 0.42 |
| 147 | 8 | 0.17 | 0.23 | 0.84 |
| 148 | 9 | 0.20 | 0.28 | 3.37 |
| 149 (comparative) | Dispersogen ® LFH | 0.15 | 0.32 | 6.91 |

Figure 6:
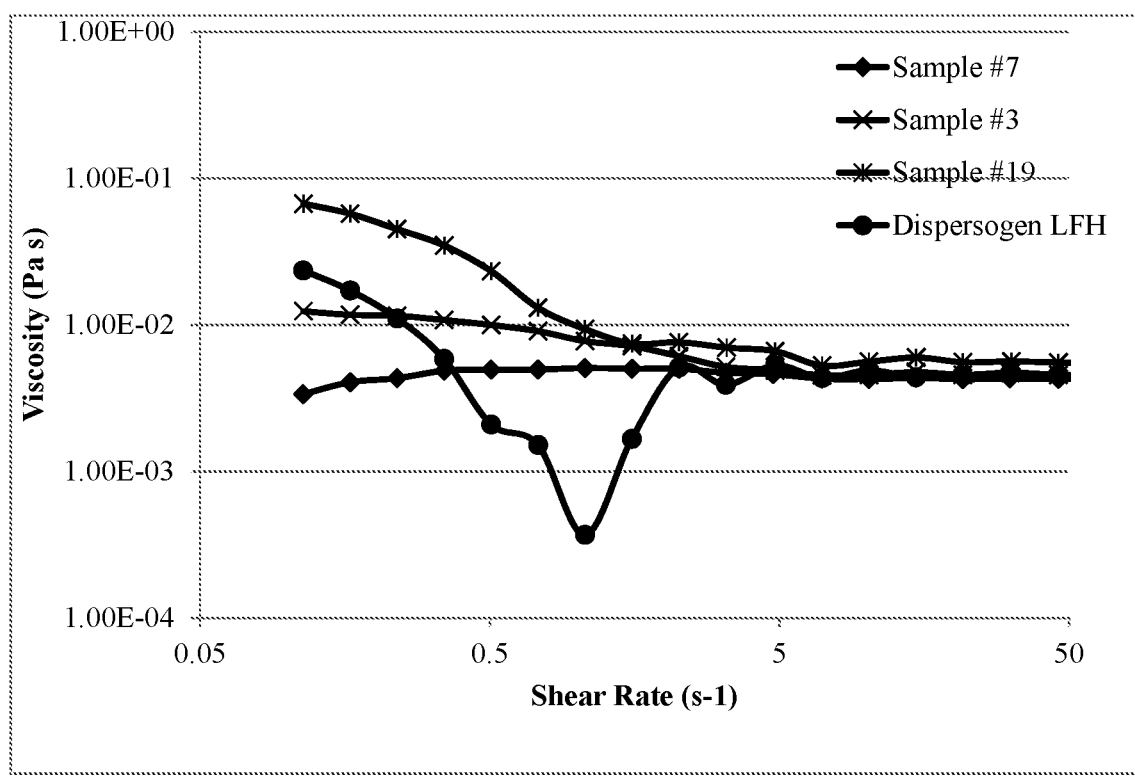
FIG. 6 is a graph of viscosity vs. shear rate for four different dispersants at a concentration of 2.4 wt % using a first blue pigment concentrate loaded at 30% in water.

Dispersion formulations were prepared comprising 30% Heliogen Blue Pigment, 2.4% of dispersant compositions 3, 7, and 19 of Table B and comparative dispersant composition Dispersogen LFH, and water as the medium. The rheologies of these formulations were evaluated. The results are illustrated in FIG. 6.

Dispersion formulations were prepared comprising 30% A193 copper phthalocyanine blue pigment material and 2.4% by weight of selected dispersant compositions using water as the medium, and mixed as described above. The particle size distribution of each formulation was evaluated. The results are shown in Table 10.

TABLE 10

Particle size distribution of the Copper Phthalocyanine_pigment A193 concentrates (30% with 2.4% dispersant)

| Dispersion Formulation | Dispersant Composition | D10 (μm) | D50 (μm) | D90 (μm) |
|---|---|---|---|---|
| 150 (comparative) | Nuosperse FA 196 | 0.18 | 0.58 | 5.85 |
| 151 | 4 | 0.14 | 0.25 | 3.37 |
| 152 | 1 | 0.14 | 0.25 | 3.66 |
| 153 (comparative) | Dispersogen LFH | 0.13 | 0.19 | 1.48 |
| 154 | 7 | 0.11 | 0.14 | 0.45 |
| 155 | 10 | 0.12 | 0.16 | 0.52 |

Figure 7:
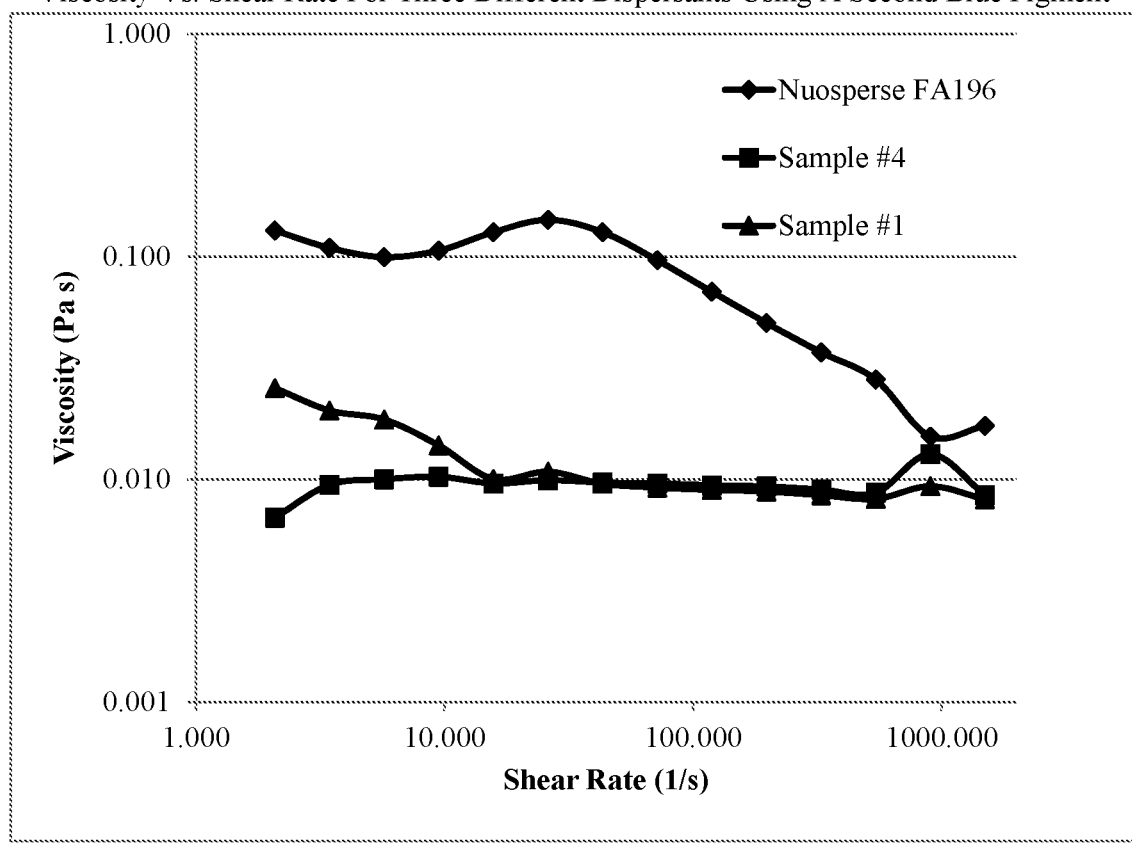
FIG. 7 is a graph of viscosity vs. shear rate for three different dispersants at a concentration of 2.4 wt % using a second blue pigment concentrate loaded at 30% in water.

Dispersant formulations were prepared comprising 30% copper phthalocyanine blue A193 in water medium with 2.4% of each of dispersant compositions 1 and 4 of Table B, and Nuosperse FA196 as a comparative formulation. The rheologies of the formulations were evaluated. The results are shown in FIG. 7.

Example 6

Titanium Dioxide Dispersion Formulations Using Organic Aliphatic Medium

The dispersion formulations in this Example 6 were prepared using a titanium dioxide pigment sold under the name Titanium Oxide W946 and available from AkzoNobel.

Dispersion concentrate formulations were prepared comprising 50% titanium dioxide pigment material and 0.8% by weight of dispersant compositions 14, 12 and 13 of Table B using as the medium an ethylene glycol monobutyl ether sold under the name Butyl Cellosolve™ by The Dow Chemical Company, and mixed as described above. A comparative example was prepared using no dispersant.

Figure 8:
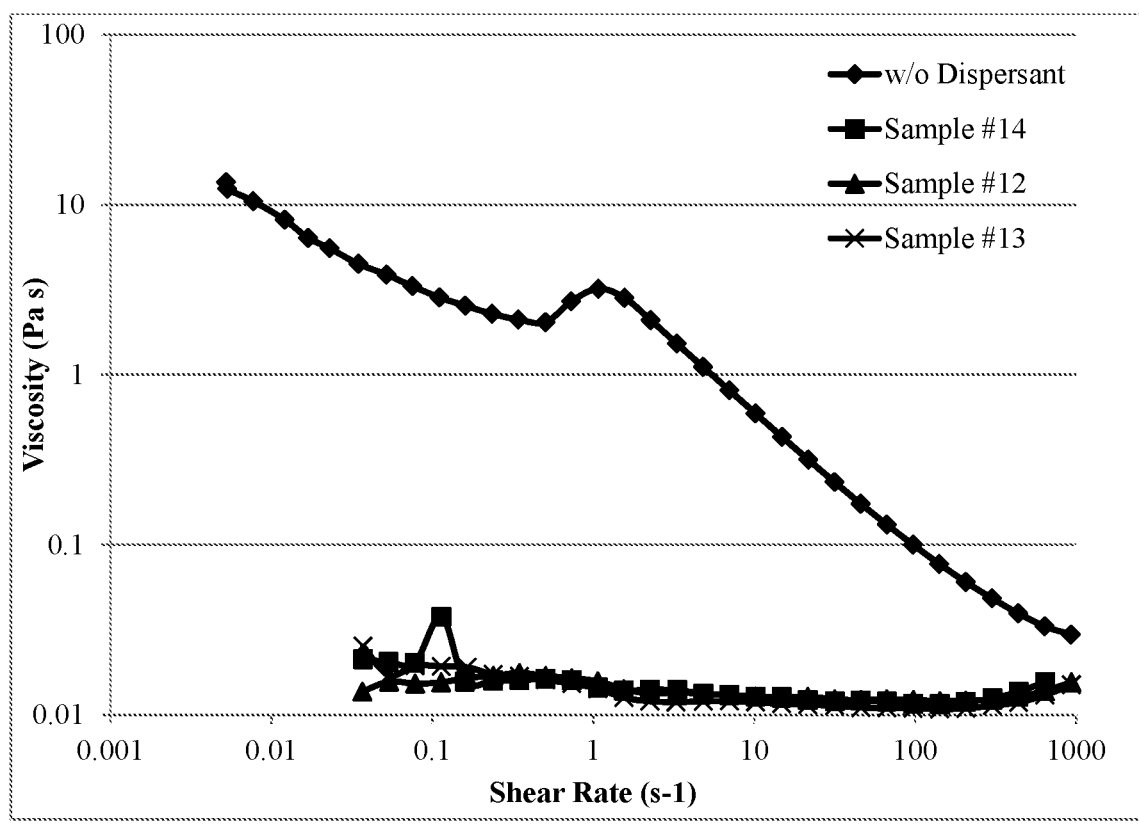
FIG. 8 is a graph of viscosity vs. shear rate for four different dispersants at a concentration of 0.8 wt % using a titanium dioxide pigment loaded at 50% in an alcohol-based solvent.

The rheologies of the four formulations were evaluated. The results are illustrated in FIG. 8. The formulations made using the dispersant compositions of the present disclosure exhibited an almost Newtonian rheology profile.

Example 7

Titanium Dioxide Dispersion Formulations Using Organic Aromatic Medium

The dispersion formulations in this Example 7 were prepared using a titanium dioxide pigment sold under the name Titanium Oxide W946 and available from AkzoNobel.

Dispersion concentrate formulations were prepared comprising 50% titanium dioxide pigment material and 0.8% by weight of dispersant compositions 14, 12, and 13 of Table B using xylene supplied by J. T. Baker as the medium, and mixed as described above. A comparative example was prepared using no dispersant.

Figure 9:
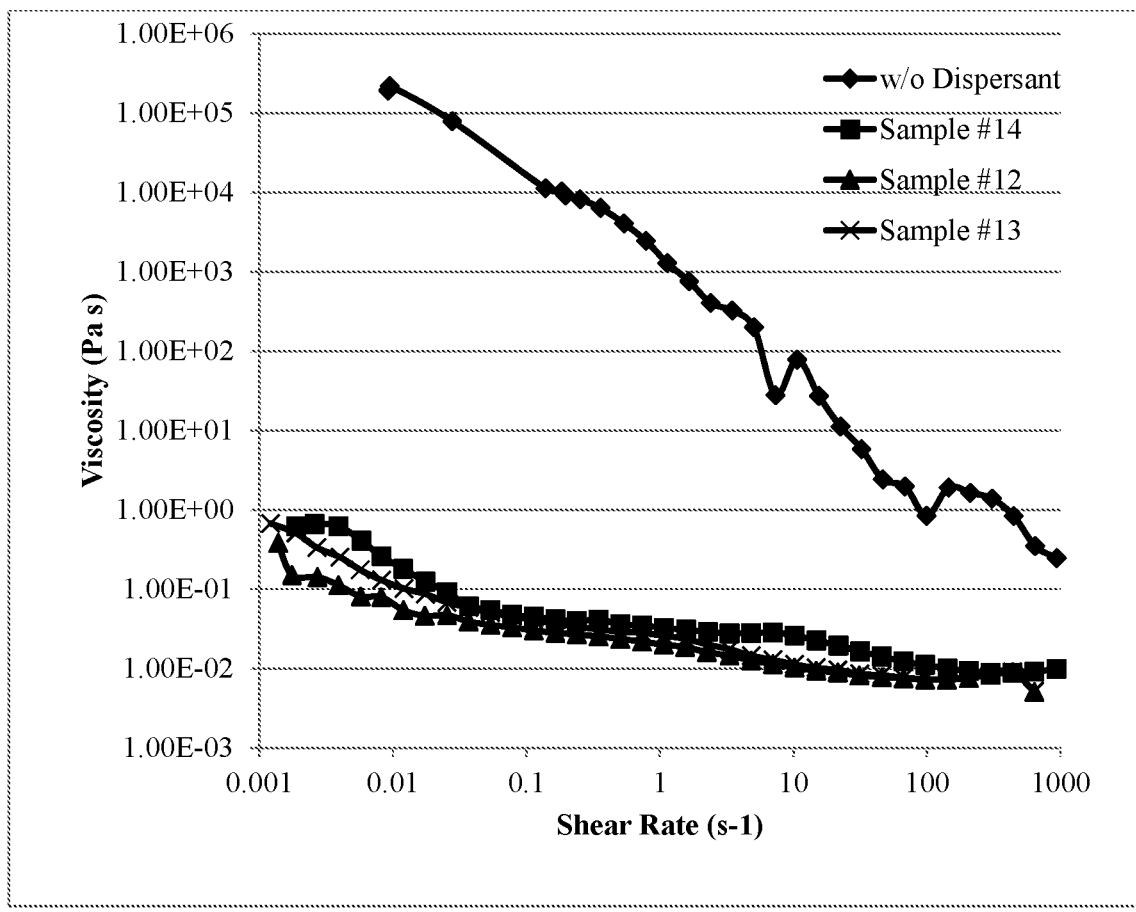
FIG. 9 is a graph of viscosity vs. shear rate for four different dispersants at a concentration of 0.8 wt % using titanium dioxide pigment loaded at 50% in a xylene solvent.

The rheologies of the four formulations were evaluated. The results are illustrated in FIG. 9. The formulations made using the dispersant compositions of the present disclosure exhibited an almost Newtonian rheology profile.

Example 8

Zirconium Dioxide Dispersion Formulations Using Alcohol Medium

The dispersion formulations prepared in this Example 8 were prepared using zirconium oxide having a density of 5 g/ml dispersed as 15 wt % in alcohol solvent with 2 wt % of dispersant composition 20 as identified in Table B above.

The particle size distribution of each formulation was evaluated. The results are shown in Table 11.

TABLE 11

Particle size distribution of the Zirconia (density 5 g/ml) dispersion in solvent (15% with 2% dispersant)

| Dispersion Formulation | Dispersant Composition | D10 (μm) | D50 (μm) | D90 (μm) |
|---|---|---|---|---|
| 154 in Ethanol | 20 | 0.315 | 0.48 | 1.3 |
| 155 in isopropyl alcohol | 20 | 0.314 | 0.47 | 1.04 |

ADDITIONAL EXAMPLES

Additional examples (Examples A, B, C, D) show that by altering the choice of hydrophobe and the PO/EO ratio, chemistries are generated that show excellent dispersant properties for use in agricultural suspension concentrate (SC) formulations. An agricultural suspension concentrate formulation is a liquid formulation that includes a suspension of solid particles (e.g. pesticides, herbicides, etc.) in an aqueous fluid, generally at 30% or greater solids. The SC solution is then typically diluted (to approximately 1%) with water before use. The function of the dispersant is to maintain that the particles remain dispersed in the aqueous solution, whether it is concentrated or dilute.

In Examples A and B the dispersants were evaluated as a dilute (1%) solution in hard (1000 ppm) water. In Examples C and D, the dispersants were evaluated in SC compositions.

The first alteration (Example A), the effect of hydrophobe structure on dispersant performance is evaluated. In the next alterations, (Examples B, C, D) the effect of the propylene oxide/ethylene oxide combination, orientation and level was evaluated.

The formulation for the SC used in these examples is listed in Table 12 below. To formulate the SC sample, the active is blended with water, a wetting agent (Morwet EFW—a blend of sodium alkylnaphthalensulfonate and anionic surfactants), and a defoamer. This mixture is ground (wet milled) until the active particle size is approximately 6-8 microns. Next the ethylene glycol, the thickener, and the dispersant are added in and blended.

TABLE 12

Suspension Concentrate (SC) Formulation

| Ingredients | % in Final Formulation |
| --- | --- |
| Active | 30% (e.g. 10 to 50%) |
| Wetting agent (Morwet EFW) | 2.00% (e.g. 0.5 to 5%) |
| Dispersant (Agrilan 1015) | 2.50% (e.g. 1 to 10%) |
| Ethylene Glycol | 5.00% |
| Defoamer (Agnique DFM 111S) | 0.10% |
| Thickener (Guar, xanthan gum) | 0.1% (e.g. 0.05 to 1%) |
| Water | Balance |

The dispersant utilized in Examples A-D has the following general formula:

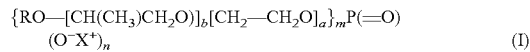

$$\{RO—[CH(CH_3)CH_2O]_b[CH_2—CH_2O]_a\}_mP(=O)(O^-X^+)_n \quad (I)$$

wherein R=C10 to C18 linear or branched with a typical range of R=C10 to C13 being linear or branched. Moreover, a=0 to 50 and b=0=30, wherein a+b>0. Typically, a=7 to 20 and b=5 to 15, wherein the ratio of a:b is greater than 1. In addition, if m=1 then n=2 (monoester), wherein if m=2 then n=1 (diester) and the product is a mixture of both mono and di-ester.

Example A: Effect of Hydrophobe Structure on Dispersant Performance

Samples were evaluated in a dilute (1% active pesticide) dispersion by blending 3.3 grams of the SC formulation into 96.7 grams of hard water (1000 ppm). It is known that the harder the water, the more challenging it is for the dispersant to generate a stable formulation. The mixture was blended using a magnetic stir bar for 5 minutes and then transferred into a 100 ml sedimentation tube. The tube was inverted 20 times and then allowed to rest for 60 minutes. The smaller the amount of sedimentation, the better the dispersant properties.

The amount of sedimentation after 60 minutes was recorded and listed in Table 13 below. As shown in the table 13, samples 1-3 showed that a small hydrophobe such as 2-ethylhexyl (2EH) (R in Formula (I)) yielded a dispersant with poor properties allowing the active in samples 1-3 to flocculate and drop out of solution within 5 minutes. As shown in Table 13, this was consistent over a selection of actives. Sample 4 showed that a larger hydrophobe, i.e., a C13 hydrophobe (R in Formula (I)), produces a stable dilute dispersion with very little sedimentation after 60 minutes.

TABLE 13

Effect of the Hydrophobe Structure on Dispersant Properties

| Sample | Dispersant EO/PO Chemistry | Active | Results |
| --- | --- | --- | --- |
| 1 | R = 2EH; a = 14 (EO) b = 5 (PO) $X^+$ = H | Atrazine | Flocculated (Fail) |
| 2 | R = 2EH; a = 14 (EO) b = 5 (PO) $X^+$ = H | Captan | Flocculated (Fail) |
| 3 | R = 2EH; a = 14 (EO) b = 5 (PO) $X^+$ = H | Diuron | Flocculated (Fail) |
| 4 | R = C13; a = 13 (EO) b = 6 (PO) $X^+$ = H | Captan | Stable dispersion (Pass) |

Example B: Effect of not Having Propylene Oxide (PO) in the Backbone

Samples were prepared and tested (dilute dispersant test) as described in Example A. The results are shown in Table 14 below. Samples 5-8 contain dispersants with various hydrophobes (R-group) that have only ethylene oxide (EO) in the backbone (i.e., wherein b of Formula (I) is zero). Sample 9 contains both propylene oxide and ethylene oxide in the backbone. As shown in the data in Table 14, all four samples (5-8) with only ethylene oxide, showed poor dispersant properties in the dilute dispersion testing. Whereas sample #9, which contains both propylene oxide and ethylene oxide in the backbone showed good (stable) dispersant properties. This indicates that propylene oxide, along with ethylene oxide, is needed in the dispersant chemistry to provide good dispersion

TABLE 14

| Sample | Dispersant EO- PO Chemistry | Active | Results |
| --- | --- | --- | --- |
| 5 | R = C12; a = 10 (EO) b = 0 (PO) $X^+$ = TEA TEA = triethanolamine | Captan | Flocculated (Fail) |
| 6 | R = C12; a = 15 (EO) b = 0 (PO) $X^+$ = TEA | Captan | Flocculated (Fail) |
| 7 | R = C13; a = 10(EO) b = 0 (PO) $X^+$ = TEA | Captan | Flocculated (Fail) |
| 8 | R = C13; a = 15 (EO) b = 0 (PO) $X^+$ = TEA | Captan | Flocculated (Fail) |
| 9 | R = C12 a = 10 (EO) b = 5 (PO) $X^+$ = TEA | Captan | Stable dispersion (Pass) |

Example C: Effect of PO/EO Orientation in the Backbone

This example utilized an SC having the composition shown in Table 12. In this example, the effect of the orientation of the propylene oxide (PO) to EO orientation in the backbone on SC stability is evaluated. Stability is measured by any observable change in viscosity of the SC after 2 weeks at room temperature. Samples 10, 11, and 12 all have the ethylene oxide attached to the C12 carbon and then the propylene oxide is attached to the ethylene oxide. The stability results are shown in Table 15 below. All three samples showed significant viscosity increase shortly after they were formulated, which is an indication of an unstable composition. Samples 13 and 14 both have the propylene oxide attached to the C12 and C13 carbon and both showed no increase in viscosity upon standing, which indicates a stable SC composition. This was observed whether the thickener was guar or xanthan gum or not present at all. This confirms that having the propylene oxide connected to the carbon chain and then the ethylene oxide connected to the propylene oxide generates a dispersant having optimum performance in the SC.

TABLE 15

Effect of dispersant PO/EO orientation on SC stability

| Sample | PO/EO Structure | Dispersant Chemistry | Active | % Thickener | Results -Room Temp (RT) |
|---|---|---|---|---|---|
| 10 | EO followed by PO | R = C12; a = 10 (EO) b = 5 (PO) $X^+$ = TEA | Diuron SC | 0.1% Guar | viscosity increased |
| 11 | EO followed by PO | R = C12; a = 10 (EO) b = 5 (PO) $X^+$ = TEA | Diuron SC | none | viscosity increased |
| 12 | EO followed by PO | R = C12; a = 10 (EO) b = 5 (PO) $X^+$ = TEA | Diuron SC | 0.1% Xanthan | viscosity increased |
| 13 | PO followed by EO | R = C12; a = 10 (EO) b = 5 (PO) $X^+$ = TEA | Diuron SC | 0.1% Xanthan | No increase in viscosity |
| 14 | PO followed by EO | R = C13; a = 10 (EO) b = 5 (PO) $X^+$ = TEA | Diuron SC | 0.1% Xanthan | No increase in viscosity |

Example D: Effect of the Ratio of PO to EO on Dispersant Performance

SC samples (see table 12) were formulated with a series of dispersants that differed in hydrophobe and number of EO units attached to the PO. All were formulated using the active diuron. The formulations were poured into 15 ml separatory funnels and placed in a 54° C. oven for two weeks. After 2 weeks, the samples were removed from the oven and the amount of separation was measured and % separation calculated. The results are listed in Table 16 below. The smaller the % separation the better the stability of the SC.

The results are set forth in Table 16 below wherein four samples are shown. Sample 15 included a C13 hydrophobe (R in Formula (I)) with 5 PO and 5EO. Sample 16 also includes the same C13 hydrophobe (R in Formula (I)) with 5PO and 10 EO. Samples 17 and 18 were the same as Sample 15 and 16 respectively with a C10 hydrophobe instead of C13 (R in Formula (I)). For both the C13 and C10 samples, the 5PO/10EO samples showed better stability than the 5PO/5EO samples. Sample 19 is the same as sample 18 (with C10 hydrophobe and 5PO/10EO) but with a different counter ion ($X^+$=K in Formula (I)). The data in table 16 showed that samples with 5PO/10EO showed better stability than samples with 5PO/5EO independent of the counter ion.

TABLE 16

| Sample | Dispersant Chemistry | Active | % Separation |
|---|---|---|---|
| 15 | R = C13; a = 5 (EO) b = 5 (PO) $X^+$ = TEA | Diuron | 5.6 |
| 16 | R = C13; a = 10 (EO) b = 5 (PO) $X^+$ = TEA | Diuron | 3.5 |
| 17 | R = C10; a = 5 (EO) b = 5 (PO) $X^+$ = TEA | Diuron | 4.3 |
| 18 | R = C10; a = 10 (EO) b = 5 (PO) $X^+$ = TEA | Diuron | 2.1 |
| 19 | R = C10 a = 10 b = 5 $X^+$ = K | Diuron | 2.25 |

As shown in the Examples A-D above, the size of the hydrophobe (R-group) affects dispersant performance. For example, the data shows that larger hydrophobes (e.g. C10, C12, and C13 groups versus 2-ethylhexyl groups) provides unexpectedly superior dispersant performance. Moreover, the data shows that propylene oxide (PO) in the backbone provides unexpectedly superior dispersant performance. Still further, the data shows that the orientation of the PO to the EO (ethylene oxide) affects dispersant performance. The data shows that when the PO is attached to the hydrophobe and then the EO attached to the PO, the performance is superior and unexpected. If this orientation is changed, the SC is shown to be not as stable.

Although the present disclosure has been described and illustrated in detail, it is to be understood that the same is by way of illustration and example only, and is not to be taken as a limitation. The spirit and scope of the present disclosure are to be limited only by the terms of any claims presented hereafter. It is contemplated that all ranges and values set forth above can hereby be labeled "about" in various non-limiting embodiments wherein the terminology "about" is understood by those of skill in the art. Moreover, in various non-limiting embodiments, the terminology "composition" and the terminology "formulation" may be interchangeable above.

What is claimed is:

1. An agricultural suspension concentrate formulation comprising:
   a solid water insoluble or sparingly soluble pesticide; and
   a mixture of molecules of Formula (I):

$$\{RO-[CH(CH_3)CH_2O]_b[CH_2-CH_2O]_a\}_mP(=O)(O-X^+)_n \qquad (I)$$
   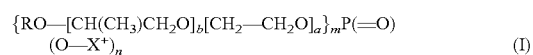

wherein
   R is a C10 branched alkyl group;
   a is 10 and b is 5;
   X+ is potassium,
   m and n are each equal to 1 or 2, such that when m=1 then n=2, and when m=2 then n=1; and
   in the mixture some of the molecules have m=1 and n=2 and some of the molecules have m=2 and n=1, wherein the mole ratio of compounds where m=1 to compounds where m=2 is of from about 1:1 to about 2:1.

2. The formulation of claim 1 that consists essentially of the solid water insoluble or sparingly soluble pesticide and the mixture of molecules of Formula (I) and wherein the pesticide is diuron.

3. The formulation of claim 1 that is further defined as an in-can pesticide formulation wherein the mixture of molecules of Formula (I) is present in an amount of from 0.05 wt % to 15 wt %.

4. The formulation of claim 1 wherein a concentration of the solid water insoluble or sparingly soluble pesticide is from 5 wt % to 65 wt %.

5. The formulation of claim 1 wherein a concentration of the solid water insoluble or sparingly soluble pesticide is from 40 wt % to 55 wt %.

6. The formulation of claim 2 that is further defined as an in-can pesticide formulation wherein the mixture of molecules of Formula (I) is present in an amount of from 0.05 wt % to 15 wt %.

7. The formulation of claim 2 wherein a concentration of the diuron is from 5 wt % to 65 wt.

8. The formulation of claim 2 wherein a concentration of the diuron is from 40 wt % to 55 wt %.

9. The formulation of claim 1 that is further defined as a tank mix pesticide spray solution wherein the mixture of molecules of Formula (I) is present in an amount of from 0.075% to 1% in weight % mixture basis in the total spray solution.

10. The formulation of claim 1 further comprising an active agent selected from the group consisting of herbicides, fungicides, plant health agents, and combinations thereof, wherein a weight ratio of the solid water insoluble or sparingly soluble pesticide to the active agent is from 2:1 to 6:1.

11. The formulation of claim 1 wherein a concentration of the solid water insoluble or sparingly soluble pesticide is from 360 to 600 g a.e./L, and a weight ratio of the solid water insoluble or sparingly soluble pesticide wt. % a.e. to the mixture of compounds of Formula (I) is from 3.5:1 to 8:1.

12. The formulation of claim 2 that is further defined as a tank mix pesticide spray solution wherein the mixture of molecules of Formula (I) is present in an amount of from 0.075% to 1% in weight % mixture basis in the total spray solution.

13. The formulation of claim 2 further comprising an active agent selected from the group consisting of herbicides, fungicides, plant health agents, and combinations thereof, wherein a weight ratio of the diuron to the active agent is from 2:1 to 6:1.

14. The formulation of claim 2 wherein a concentration of the diuron is from 360 to 600 g a.e./L, and a weight ratio of the diuron wt. % a.e. to the mixture of compounds of Formula (I) is from 3.5:1 to 8:1.

15. The formulation of claim 1 wherein the solid water insoluble or sparingly soluble pesticide is selected from the group consisting of diuron, captan, atrazine, and combinations thereof.

16. The formulation of claim 15 that is further defined as an in-can pesticide formulation wherein the mixture of molecules of Formula (I) is present in an amount of from 0.05 wt % to 15 wt %.

17. The formulation of claim 15 wherein a concentration of the solid water insoluble or sparingly soluble pesticide is from 40 wt % to 55 wt %.

18. The formulation of claim 15 that is further defined as a tank mix pesticide spray solution wherein the mixture of molecules of Formula (I) is present in an amount of from 0.075% to 1% in weight % mixture basis in the total spray solution.

19. The formulation of claim 15 further comprising a active agent selected from the group consisting of herbicides, fungicides, plant health agents, and combinations thereof, wherein a weight ratio of the solid water insoluble or sparingly soluble pesticide to the active agent is from 2:1 to 6:1.

20. The formulation of claim 15 wherein a concentration of the solid water insoluble or sparingly soluble pesticide is from 360 to 600 g a.e./L, and a weight ratio of the solid water insoluble or sparingly soluble pesticide wt. % a.e. to the mixture of compounds of Formula (I) is from 3.5:1 to 8:1.

* * * * *